(12) United States Patent  
Jacobson et al.

(10) Patent No.: US 8,914,414 B2
(45) Date of Patent: Dec. 16, 2014

(54) INTEGRATED REPOSITORY OF STRUCTURED AND UNSTRUCTURED DATA

(71) Applicant: Apple Inc., Cupertino, CA (US)

(72) Inventors: Eric Jacobson, San Jose, CA (US); Les Thomas, Los Gatos, CA (US); Gang Zhang, Fremont, CA (US)

(73) Assignee: Apple Inc., Cupertino, CA (US)

( * ) Notice: Subject to any disclaimer, the term of this patent is extended or adjusted under 35 U.S.C. 154(b) by 93 days.

(21) Appl. No.: 13/792,956

(22) Filed: Mar. 11, 2013

(65) Prior Publication Data

US 2013/0198233 A1    Aug. 1, 2013

Related U.S. Application Data

(63) Continuation of application No. 12/940,986, filed on Nov. 5, 2010, now Pat. No. 8,396,894.

(51) Int. Cl.
*G06F 17/30* (2006.01)
(52) U.S. Cl.
CPC .... *G06F 17/30477* (2013.01); *G06F 17/30557* (2013.01)
USPC .......................................................... 707/793
(58) Field of Classification Search
CPC ................................................ G06F 17/30132
USPC .................. 707/2, 3, 774, 793; 709/204–206
See application file for complete search history.

(56) References Cited

U.S. PATENT DOCUMENTS

| | | | |
|---|---|---|---|
| 5,745,899 | A | 4/1998 | Burrows |
| 5,924,096 | A | 7/1999 | Draper et al. |
| 6,266,673 | B1 | 7/2001 | Hong et al. |
| 6,581,062 | B1 | 6/2003 | Draper et al. |
| 6,931,408 | B2 | 8/2005 | Adams et al. |
| 2006/0020646 | A1 | 1/2006 | Tee et al. |
| 2007/0088695 | A1 | 4/2007 | Bleyendaal et al. |
| 2008/0104535 | A1 | 5/2008 | DeLine et al. |
| 2010/0228721 | A1* | 9/2010 | Mok et al. ................ 707/711 |

* cited by examiner

*Primary Examiner* — Etienne Leroux
(74) *Attorney, Agent, or Firm* — Fish & Richardson P.C.

(57) ABSTRACT

Methods, program products, and systems implementing integrated repository of structured and unstructured data are disclosed. An integrated environment is provided for accessing, structured data (e.g., data of a relational database) and unstructured data (e.g., data stored in a text or binary file), including creating, managing, modifying, and searching the structured data and unstructured data. The integrated environment can include an integrated user interface, a set of commands and application programming interface (API), and storage for a relational database and a document repository. The integrated environment can include a database abstraction layer that allows database operations on both the structured data and the unstructured data.

18 Claims, 18 Drawing Sheets

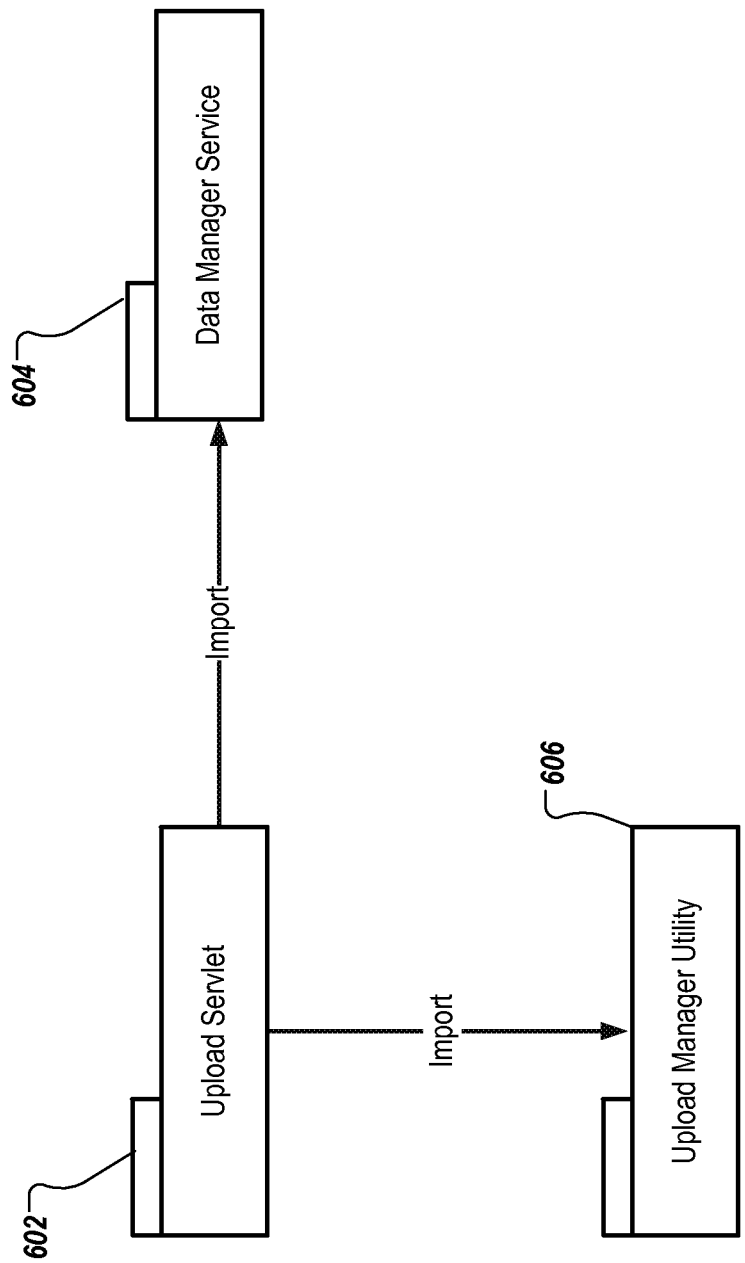

INTEGRATED REPOSITORY OF STRUCTURED AND UNSTRUCTURED DATA

CROSS REFERENCE TO RELATED APPLICATIONS

This application is a continuation of and claims priority to U.S. patent application Ser. No. 12/940,986, entitled "Integrated Repository of Structured and Unstructured Data," filed on Nov. 5, 2010, the entire contents of which are incorporated herein by reference.

TECHNICAL FIELD

This disclosure relates generally to database architecture.

BACKGROUND

Data can be stored in various formats, including in a relational database or as a file. A relational database can include a collection of relations, frequently known as tables. A table in the relational database can correspond to a logical structure in which data can be stored. The table can include a set of data elements or values that are organized using vertical columns and horizontal rows. The logical structure can include, for example, a specified number of columns and a variable number of rows. Each column can have a data type that defines what category of data can be stored in the column. A row of a table can include one or more data fields. Each data field can correspond to a column, and have a data type that corresponds to the data type of the column. The logical structure, as well as relations between data in one table and data in another table can be defined using a database schema, which can be a data model that defines how data in the relational database are represented or accessed. Data in relational databases can be accessed or managed using a script written in a data manipulation language (DML), a data definition language (DDL), or a data control language (DCL).

In addition to being stored in a relational database, data can be stored in a file. The file can include a block of information in the format of a one-dimensional array of bytes. The bytes are stored sequentially. The file can be accessed through an operating system of a computing device or an application program (e.g., a file manager program such as Windows Explorer®).

SUMMARY

Methods, program products, and systems implementing integrated repository of structured and unstructured data are disclosed. An integrated environment is provided for accessing, structured data (e.g., data of a relational database) and unstructured data (e.g., data stored in a text or binary file), including creating, managing, modifying, and searching the structured data and unstructured data. The integrated environment can include an integrated user interface, a set of commands and application programming interface (API), and storage for a relational database and a document repository. The integrated environment can include a database abstraction layer that allows database operations on both the structured data and the unstructured data.

In some implementations, the integrated environment can include integrated search functions that allow search of structured data and unstructured data. An index of a relational database can be integrated with an index of the unstructured data. The index of the relational database can include a data structure created based on one or more columns of a database table, a function, or an expression. The index of the unstructured data can include an index created based on content of the unstructured data. The integrated search functions can be performed on a combined index that includes both the database index and the index of the unstructured data, or performed separately on each of the indices in the backend.

An integrated repository of structured and unstructured data can be utilized to achieve one or more of the following advantages. An integrated environment can provide a user flexibility for managing data by accepting both structured data and unstructured data as input in a single user interface (e.g., a database form). The integrated environment can provide a user flexibility for accessing the data using a single user interface (e.g., a database report). The integrated environment allows the user to view a document outside a database when the user is viewing content of the database. Likewise, the integrated environment allows the user to view content of the relational database when the user is viewing content of the document. The integrated environment allows the user to navigate to a document from the database content and to navigate to the database content from the document. The integrated environment can provide combined database search results and document search results in response to a user query. The database search results and document search results can be presented in a response page that allows the user to quickly view both content of the relational database and the document.

An integrated repository of structured and unstructured data can be utilized to implement contact list management. Document management capabilities of the integrated repository of structured and unstructured data can be advantageous to human resources and personnel tracking where contact lists are used. For example, a resume can be associated with a candidate or a personnel record. Document search from within a database can be used to identify candidates with particular skill sets. Performance reviews and other employee related paperwork can be stored in association with employee records.

Document management capabilities can be advantageously implemented for customer service or sales leads. A personal selling environment can be created, in which letters and other correspondence with each customer can be tracked. Requests for proposals (RFPs) and responses can be stored. Document search can be used to cross reference similar requests and previous proposals.

Document management capabilities can be useful in maintaining group, club, or team membership lists. Membership applications can be stored in association with data records. Biographical entries on members can be used in publications. Document search can be used to locate and associate meeting notes and minutes to group members.

An integrated repository of structured and unstructured data can be utilized to manage events. A relational database can store structured data including details of each event (e.g., date, time, and venue). Event planning often requires numerous documents (e.g., agendas or event schedules) to be associated with an event. An agenda or event schedule can be associated to each event record. Document search can be used to identify past events with a specific speaker or host. Permits and contracts associated with the event can be stored. Document search can be used to identify events based on a schedule. The identified events can be linked to a current event.

An integrated repository of structured and unstructured data can be utilized to manage assets. Structured data can be used to track common details of assets. Unstructured data can be used to store original invoices with each item of the assets. A same invoice can be associated with multiple asset items as needed. Insurance policies or liability waivers can be associated with each asset item. A history of warranty and service requests can be associated with the asset item.

An integrated repository of structured and unstructured data can be utilized to manage product lists. A document management tool can access and manage structured data describing a product. In addition, the document management tool can associate unstructured data (e.g., product data sheets) with each product. The unstructured data can ensure that the most current product information is available to a user managing the product. The user's search on a product detail that is described in a document can return relevant results, even when the detail is not tracked in a database field. A search on a concept that is linked to a specific product can be responded with the product, if the concept is in a design document of the product. The document management tool can store product documentation to provide distribution and indexing of content related to the product. The document management tool can archive product introductions and marketing presentations, including, for example: associating related products to a relevant slide deck; ensuring product slides are updated in response to updating a single document record; and ensuring quick access to sales information when a customer asks about a product.

An integrated repository of structured and unstructured data can be utilized to assist creative project tracking. Database records can be used to track each project in a creative professional environment like advertising or graphic design. Project requirements documents can be associated with each project. Design files can be stored in association with project details for sharing with a team. A proof or thumbnail image can be stored in a catalog. Document association functions can be used to store full resolution files for download. Search capability features can be provided to search past projects for similar requirements to facilitate re-use or avoid duplication. Story-boards for advertising can be searched to check uniqueness. Ad contracts can be searched for contacts with different publications or sources.

An integrated repository of structured and unstructured data can be utilized in education and non-profit industries, where entities often rely on third party organizations and governmental groups for funding. Oftentimes, multiple grants or allocations can provide resources for a group. Some high-level fields related to grants can be tracked by structured data, but some data are document-related. The techniques described in this specification can be utilized to associate grant applications and reports with a particular funding source, and search past application data for key terms to ensure consistency in reporting. A single repository of all documents can prevent information loss in high-turnover organizations.

An integrated repository of structured and unstructured data can be utilized for workgroup document tracking. Workgroups often share files among group members. The files can be shared using a document catalog (described below). Storing files using a document catalog can provide the following advantages: a shared repository allows multiple users to have access to the same version of a file; an archive allows a user to search for previous reports or presentations to avoid duplicating work of others; critical organization documents can be backed up off-site; and document status or other custom attributes can be tracked.

The details of one or more implementations of an integrated repository of structured and unstructured data are set forth in the accompanying drawings and the description below. Other features, aspects, and advantages of integrated repository of structured and unstructured data will become apparent from the description, the drawings, and the claims.

BRIEF DESCRIPTION OF THE DRAWINGS

FIG. 6A is a block diagram illustrating example components implementing functions of uploading unstructured data.

Like reference symbols in the various drawings indicate like elements.

DETAILED DESCRIPTION

Exemplary Integrated Repository

Figure 1:
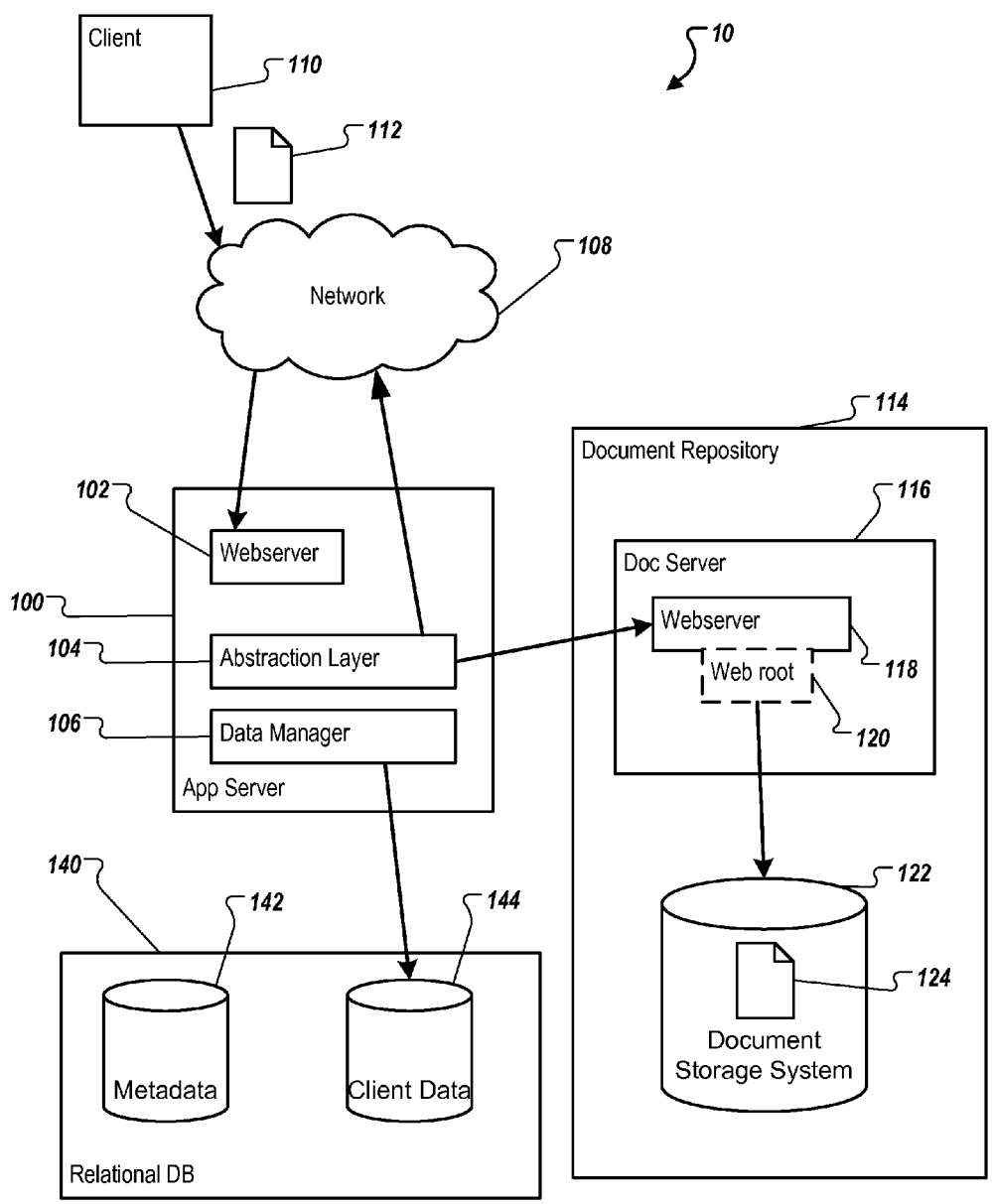
FIG. 1 is a block diagram illustrating an exemplary integrated repository of structured and unstructured data.

FIG. 1 is a block diagram illustrating an exemplary integrated repository 10 of structured and unstructured data. The integrated repository 10 can include application server 100, database subsystem 140, and document repository 114. Functions of application server 100, database subsystem 140, and document repository 114 will be described in further detail below.

Application server 100 can include a system that implements methods that allow structured data and unstructured data to be stored in the integrated repository 10, and methods that allow access and manipulation of data in the integrated repository 10.

Application server 100 can include web server 102, data abstraction layer 104, and data manager 106. Webserver 102 can include a subsystem that includes a web server computer and a web serving application program. The web serving application program can include a hypertext transfer protocol (HTTP) server program (e.g., Apache® HTTP server). Webserver 102 can be configured to receive data access requests and data uploads from client 110, which can be connected to application server 100 through communications network 108. Client 110 can include a client computer, a web browser that executes on a client computer, or both.

Webserver 102 can receive document 112 sent from client 110 in an upload operation. Document 112 can include unstructured data to be stored in the integrated repository 10. The unstructured data can include any data (e.g., text data, binary data, multimedia data) in any format (e.g., in American standard code for information interchange (ASCII) format, or any audio, graphic, or video file format) that is not defined by a schema of database subsystem 140. Document 112 can be uploaded by an HTTP request (e.g., HTTP Post) from client 110. Other known communication protocols are also possible.

Upon receiving document 112, webserver 102 can transfer document 112 to data abstraction layer 104 for further processing. Data abstraction layer 104 can include one or more application programs that are configured to cause one or more processors to perform operations of integrating structured data and unstructured data. Some of the operations can include requesting data manager 106 to perform document analysis on document 112. The document analysis can include identifying various attributes of document 112 and generating metadata of the document 112. The metadata can be stored in metadata database 142 of database subsystem 140.

Data abstraction layer 104 can perform operations of sending document 112 to document repository 114. Document repository 114 can include document server 116. Document server 116 can include webserver 118 (e.g., a Lighttpd® webserver) that is optimized for high volume and speed-critical document transfer operations. Webserver 118 can be associated with file system reference 120 (e.g., a web root directory). File system reference 120 can refer to document storage subsystem 122 that is configured to store one or more documents 124. Document storage subsystem 122 can include, for example, a local storage system or one or more devices on a storage area network (SAN).

Data manager 106 can manage data stored in database subsystem 140. The data stored in database subsystem 140 can be structured data. Structured data can include data items whose relationship to one another and whose structures are defined in a database schema of database subsystem 140. Database subsystem 140 can include metadata database 142 and client data database 144. Metadata database 142 can store attributes (e.g., file type and file size) and other metadata of document 112. Client data database 144 can store structured data from client 110 or to be presented to client 110, together with document 112, in an integrated environment.

Upon storing document 112 in document repository 114 and attributes and other metadata of document 112 in database subsystem 140, application server 100 can send a response to client 110. The response can include a response code and one or more default attributes of document 112 (e.g., type or size). Once client 110 receives the response, client 110 can perform at least one of the following options: (1) send another request (e.g., HTTP Post) to upload another document; or (2) send a confirmation to application server 100. If application server 100 receives the confirmation, data manager 106 of application server 100 can update database subsystem 140 by providing various attributes of document 112 for storage (e.g., by committing the metadata of document 112).

Metadata database 142 can serve as a link between documents 124 stored in document repository 114 and structured data stored in client data database 144. A search or select request from client 110 can be processed by data manager 106. If content of document 124 satisfies search or select criteria specified in the request, the structured and unstructured data can be presented to client 110 in response. The structured and unstructured data can be presented to client 110 to be displayed in a user interface of client 110. In addition, the structured and unstructured data can be provided to an application program through an API. In some implementations, the structured and unstructured data can be provided as a web service.

Exemplary Indexing Techniques

Figure 2:
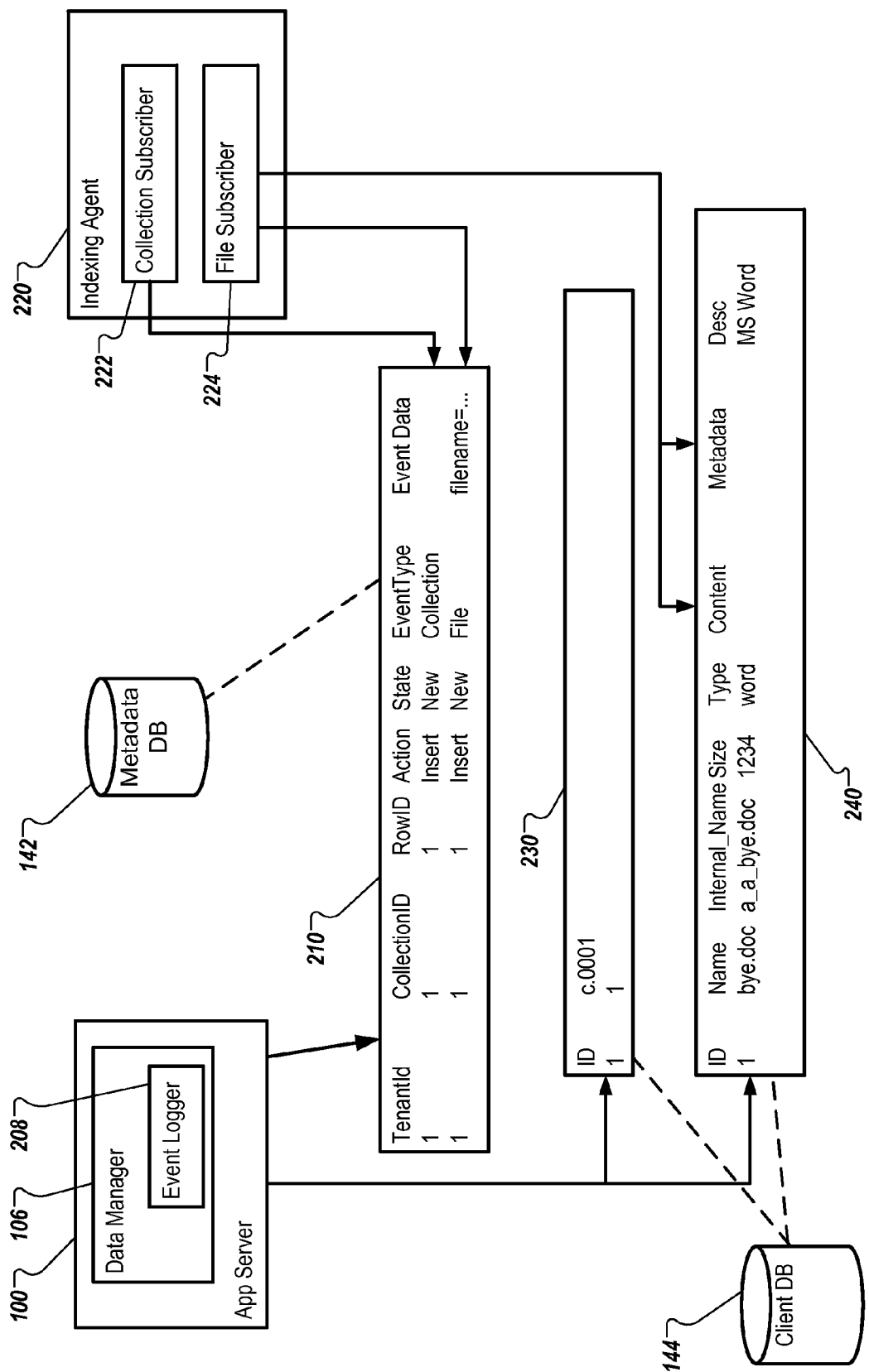
FIG. 2 is a block diagram illustrating exemplary indexing techniques used in an integrated repository of structured and unstructured data.

FIG. 2 is a block diagram illustrating exemplary indexing techniques used in the integrated repository of structured and unstructured data shown in FIG. 1. Structured data (e.g., a data item in a relational database) can be indexed upon insertion of the structured data into a table. Unstructured data, such as a document (e.g., document 112 as shown in FIG. 1) can be indexed when the document is received from a client. Index of the structured data and index of the document can be integrated to allow searching content of the document using database operations.

Data manager 106 of application server 100 can include event logger 208. Event logger 208 can update various tables in metadata database 142. One of the tables being updated can be event table 210. Event table 210 can be utilized to record various events including insertion of structured data and unstructured data. An insertion event can occur when, for example, a user creates a new data record, associates a document with the new data record, and inserts the new record into a database. When the insertion event occurs, data can be updated in event table 210 and in collection table 230 and document data structure 240. Collection table 230 and document data structure 240 can be tables for integrating structured data and the unstructured data. Collection table 230 and document data structure 240 can be tables hosted in client data database 144.

A part of the insertion event can be an insertion of a collection. The collection can be a structured set of one or more data records in client data database 144. Within the set, the data records can be organized in specified order (e.g., sort by last name). The set can be associated with a context (e.g., a purpose or an invitation to an event). The set can be exported. The insertion of the structured data can include creating the collection. The insertion of the structured data can include inserting the collection, a record into the collection, or inserting a collection based on a user specified criterion (e.g., a collection of employees working in a same city). Data manager 106 can insert the collection into collection table 230.

When the insertion occurs, event logger 208 can insert a first row into event table 210. The first row in the event table 210 can include one or more data items according to a schema defining various data fields of event table 210. The data fields can include a tenant identifier data field. The tenant identifier data field can correspond to a value that can identify a tenant, which can be a workgroup including one or more users. The data fields can include a collection identifier data field, a row identifier data field, an action data field, a state data field, an event type data field, and an event data data field. The event data data field can store a file name. The file name in the event table can be different from a row identifier. Further details of event table 210 will be described below in reference to FIG. 4.

The first row can have an event type of "collection," corresponding to the insertion of the collection.

Another part of the insertion can include inserting information of the document in one or more database tables. Data manager 106 can insert a row of data into document data structure 240. Document data structure 240 will be described in further detail below in reference to FIG. 3. A second row can be inserted into event table 210. When application server 100 receives unstructured data, event logger 208 can insert a second row into event table 210. The second row can specify an event type indicating that the data received is unstructured (e.g., a type "file"). The second row can include an identifier of the unstructured data (e.g., a file name) in an "event data" data field.

Upon detecting an insertion of structured data or reception of unstructured data, indexing agent 220 can create one or more indices for the inserted collection and the unstructured data. Indexing agent 220 can include collection event subscriber 222 that listens to insertion events of collections. Collection event subscriber 222 can detect the event inserting a collection, identify a collection identifier from the first row of event table 210, and use the collection identifier to identify the collection from collection table 230.

Indexing agent 220 can include file event subscriber 224 that listens to events of receiving unstructured data (e.g., file upload events). File event subscriber 224 can detect the event of document uploads and identify a document received. Indexing agent 220 can create an index of the uploaded document, or invoke another process (e.g., an external text indexing process) to create an index of the unstructured data. Indexing agent 220 can identify a row in document data structure 240 using an identifier in event table 210 and fill a content data field and a metadata data field of document data structure 240. The content data field can store at least a portion of the unstructured data. The portion can include, for example, a specified number (e.g., 512) of characters from the beginning of the unstructured data.

Indexing data can be modified when unstructured data are deleted or modified. During deletion of unstructured data (e.g., deletion of a document), data manager 106 can delete records related to the unstructured data from both collection table 230 and document data structure 240. Event logger 208 can log two events (deleting a record from collection table 230 and deleting a record from document data structure 240) in event table 210. The "event type" values of the two events can be "collection" and "file," respectively. The "action" values of the two events can be "row deletion" and "file deletion," respectively. Collection event subscriber 222 can pick up the event of the "row deletion" action. File event subscriber 224 can pick up the event of the "file deletion" action, and drop the deleted document from indexed documents, or inform an index engine to drop the document.

Unstructured data can be updated. Updating unstructured data can include uploading a new document to replace an existing document, or modifying document data structure 240. If a new document is uploaded, data manager 106 can update an existing record in document data structure 240. Event logger 208 can log an event into event table 210. The event can have a type "file" and action "file update."File event subscriber 224 can detect the file update indexing event for document data structure 240. Indexing agent 220 can extract content and metadata from the index file (created by indexing agent 220 or by an external indexing process) and insert the extracted content and metadata into document data structure 240. The replaced document can remain untouched in a document repository until a cleanup daemon utility program deletes the replaced document.

If document data structure 240 is updated (e.g., when a user modifies a customized document table column "description"), data manager 106 can update an existing record in collection table 230. Event logger 208 can log an event in event table 210 having a type "collection" and an action "update." Collection event subscriber 222 can detect the update collection event from collection table 230.

Exemplary Data Structures

Figure 3:
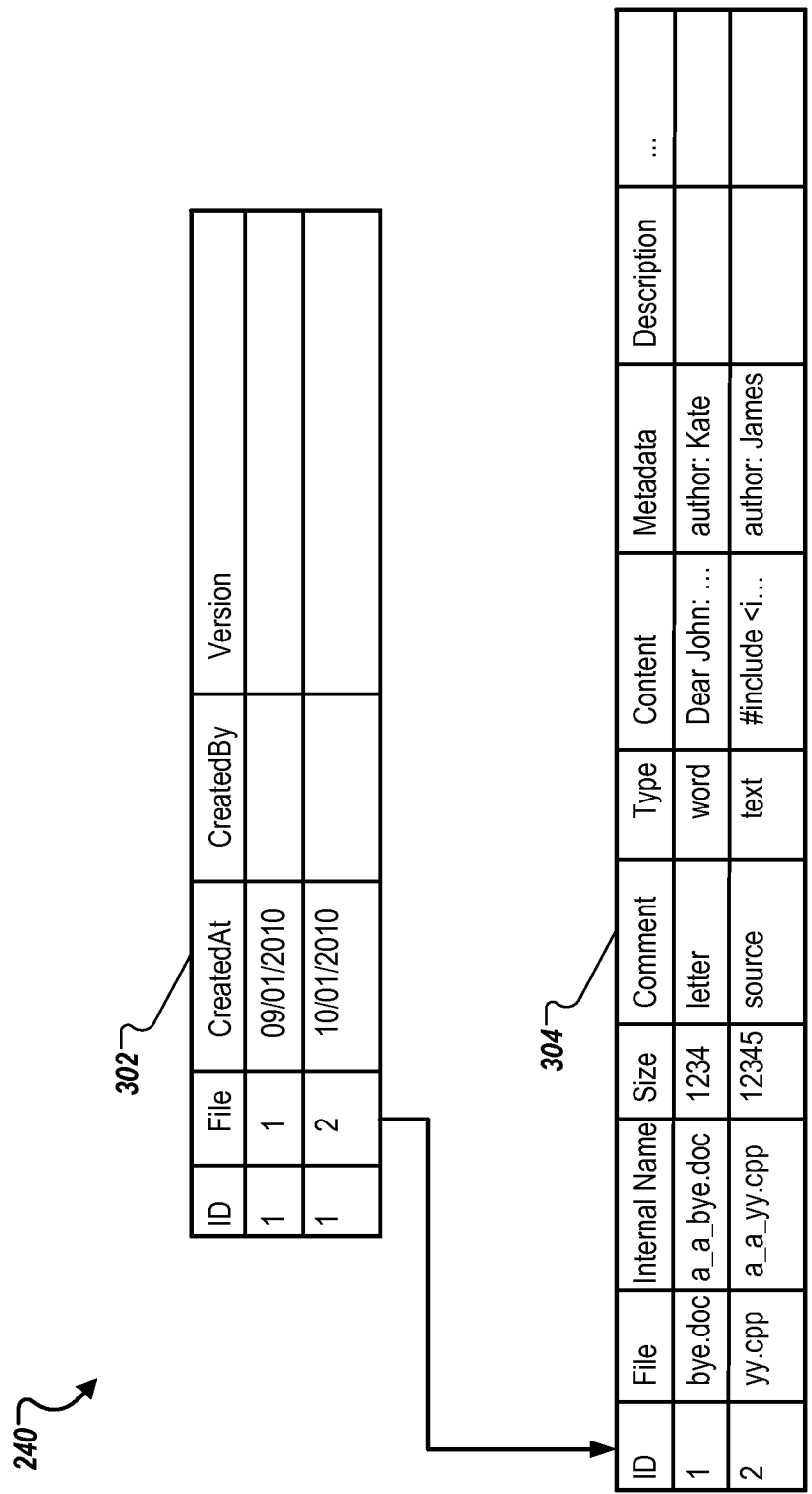
FIG. 3 is a block diagram illustrating an exemplary document data structure.

FIG. 3 is a block diagram illustrating an exemplary document data structure. Document data structure 240 can include document table 302 and file table 304. Document table 302 and file table 304 can be utilized to integrate structured data and unstructured data.

Document table 302 can include a row identifier data field, a file identifier data field for storing a foreign key to file table 304, and various descriptive data fields for storing various information of the file (e.g., a "created at" data field, "created by"data field, and a "version" data field).

File table 304 can include a tenant specific data table that contains information of all uploaded unstructured data. File table 304 can include a row identifier data field, a file identifier field (e.g., a file name field for storing a file name of the unstructured data as provided by a user), an internal file identifier field (e.g., an internal file name field for storing an internal file name of the unstructured data as automatically generated), a size field for storing a size of the unstructured data, a type field for storing a type of the unstructured data, a content data field and a metadata field whose content will be described below, and a description data field for storing description of the unstructured data.

The content data field of file table 304 can store a portion of the content of the unstructured data. The metadata data field of file table 304 can include metadata of the unstructured data. The metadata can be extracted from the unstructured data or generated automatically or manually based on the unstructured data. The metadata can be treated as part of the unstructured data. The content data field and metadata data field can both be indexed such that they are searchable using the database search (e.g., a "select" statement). Table 1 illustrates an example structure of file table 304.

TABLE 1

Document Table Structure

| Field | Type | Can Be Null | Key | Read Only |
|---|---|---|---|---|
| id | int(11) | No | Primary | Yes |
| name | varchar(512) | No | | Yes |
| internal_name | varchar(512) | No | | Yes |
| size | int(11) | No | | Yes |
| type | int(11) | No | | Yes |
| description | varchar(512) | No | | No |
| content | varchar(1024) | Yes | | Yes |
| s_result | varchar(1024) | Yes | | Yes |
| metadata | varchar(1024) | Yes | | Yes |
| created_at | datetime | Yes | | Yes |
| created_by | int(11) | Yes | | Yes |
| updated_at | datetime | Yes | | Yes |
| updated_by | int(11) | Yes | | Yes |
| version | int(11) | No | | Yes |

Some of the data fields can be immediately available once a document upload process is completed. Other data fields can be available when an indexer finishes the indexing process. The following data fields can be immediately available after an upload.

name: The name can be the original name of the document. Duplicate document names per tenant can be supported.

internal_name: The actual name of the document that can be saved on the server. The internal name will have the following format:

<timestamp>_<row_id>_<field_id>_<original_name> size: Document size in bytes.

type: The document type can be determined by a file extension name, or in some implementations, a file extension name combined with file content.

description: A short description of the document type. A user can modify the description field.

created_at: The date and time when the document is uploaded. This data field need not represent the time the document was created on a user's local disk.

created_by: The user who uploaded the document.

updated_at: The date and time when the document is updated.

updated_by: A user identifier of a user who updated the document.

version: The version of the document. Initially the version can be zero.

Each time when the user replaces an existing document with a new one, the version number can increase by one. The following data fields may not be immediately available after an upload.

content: This is the content preview of the document. A specified number of the first characters of each document can be extracted and saved in this data field. The content data field can give a user a quick review of file content. The content field can remain empty if a user uploaded a binary format document. The content can include UTF-8 (Unicode transformation format) text and may not have any formatting or picture. In some implementations, paragraph breaks can be preserved.

metadata: The indexer can extract the metadata information in a list of <name, value pairs> delimited by one or more separators (e.g., carriage return (CR) and/or line feed (LF)). Different document types can have different set of metadata. The metadata data field can remain empty if no metadata are retrieved from the document.

The "s_result" data field can be a reserved, read-only, and non-sortable data field to hold a search result temporarily. When a user performs a search, a data manager (e.g., data manager 106 of FIGS. 1 and 2) can fill this data field with all search hit context. The search hit can be surrounded by one or more words. The search hit can be emphasized (e.g., using highlight, bold font, or underline). For example, when a user searches for "rain" the search result can be " . . . today is raining but tomorrow . . . "The data manager can return the search result in s_result data field to a client. The s_result data field can be non-storable to avoid users from a same tenant interfering with each other's search.

Figure 4:
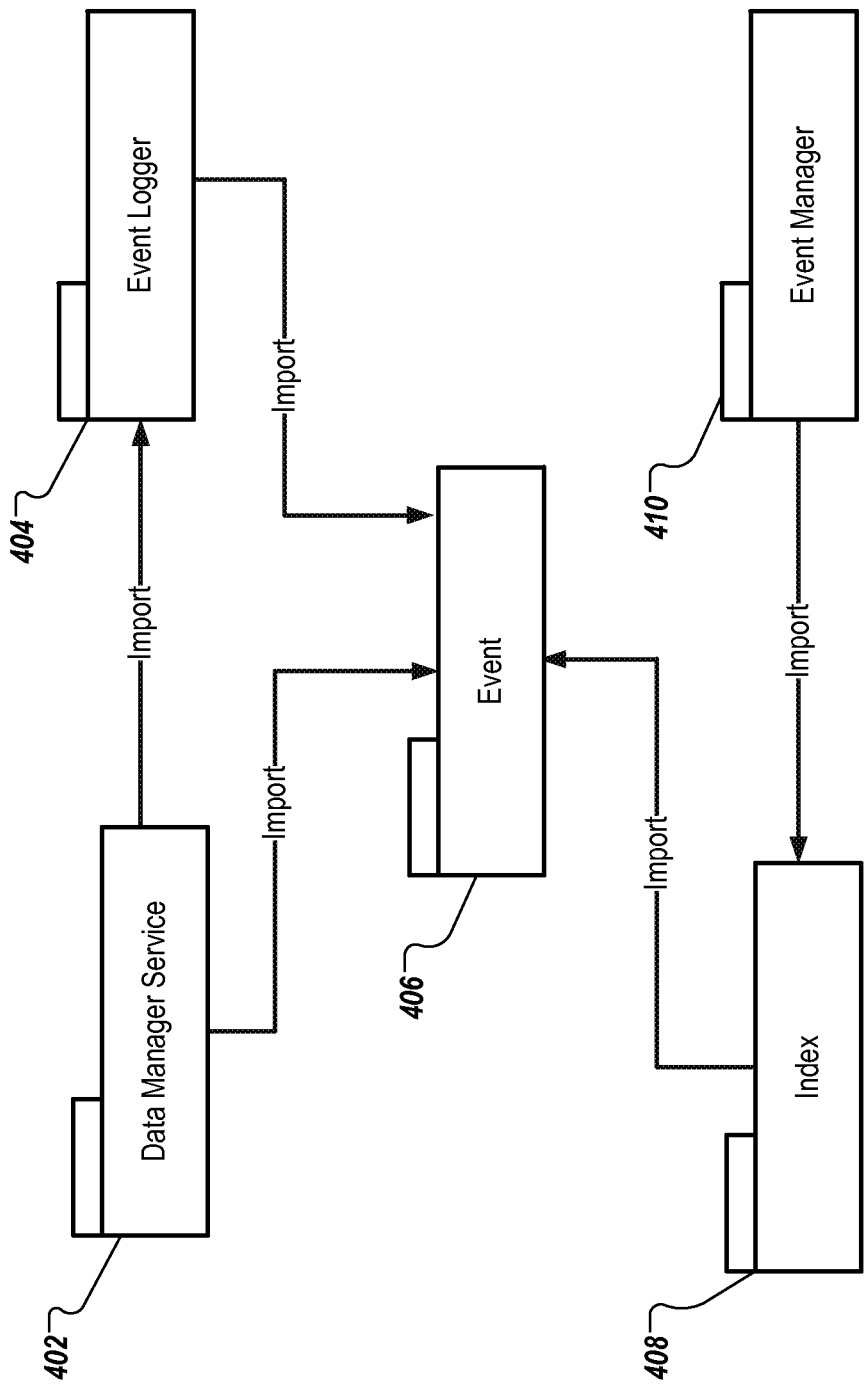
FIG. 4 is a block diagram illustrating example components implementing integrated repository of structured and unstructured data.

FIG. 4 is a block diagram illustrating example components implementing the integrated repository of structured and unstructured data. For convenience, the components will be described in terms of Java® packages.

Data manager service package 402 can import event logger package 404 and event package 406. Data manager service package 402 can include implementations of functions of data manager 106 as described above with respect to FIGS. 1 and 2. Event logger package 404 can include implementations of functions of event logger 208 as described above with respect to FIG. 2. Event package 406 provides various event handling functions. An event data object created based on specifications from event package 406 can be a data object that can represent an event that can be processed offline. An event data object can be persisted in an event table (e.g., event table 210 of FIG. 2). The event table can have data fields described below in Table 2.

TABLE 2

Event Table Structure

| Name | Type | Notes |
|---|---|---|
| id | int(11) | The sequence identifier of an event |
| tenantId | int(11) | The identifier of a tenant |
| tableId | int(11) | |
| rowId | int(11) | The identifier of a document |
| actionType | String | One of D(eleted), U(pdated), or N(ew) |
| eventType | String | "FILE" |
| eventData | String | <column id, document name> |
| createdOn | datetime | Date and time the entry is created |
| updatedOn | datetime | Date and time the entry is updated |

Index package 408 can include various functions of collection event subscription 222. The collection events can include events of dropping a collection, rebuilding a collection, row insertion of a collection, and row deletion of a collection. Index package 408 can include various functions of file event subscription 224. Each indexing agent can have a file event subscriber to serve the "FILE" type event. Event manager package 410 can import index package 408.

Exemplary Indexing System

Figure 5:
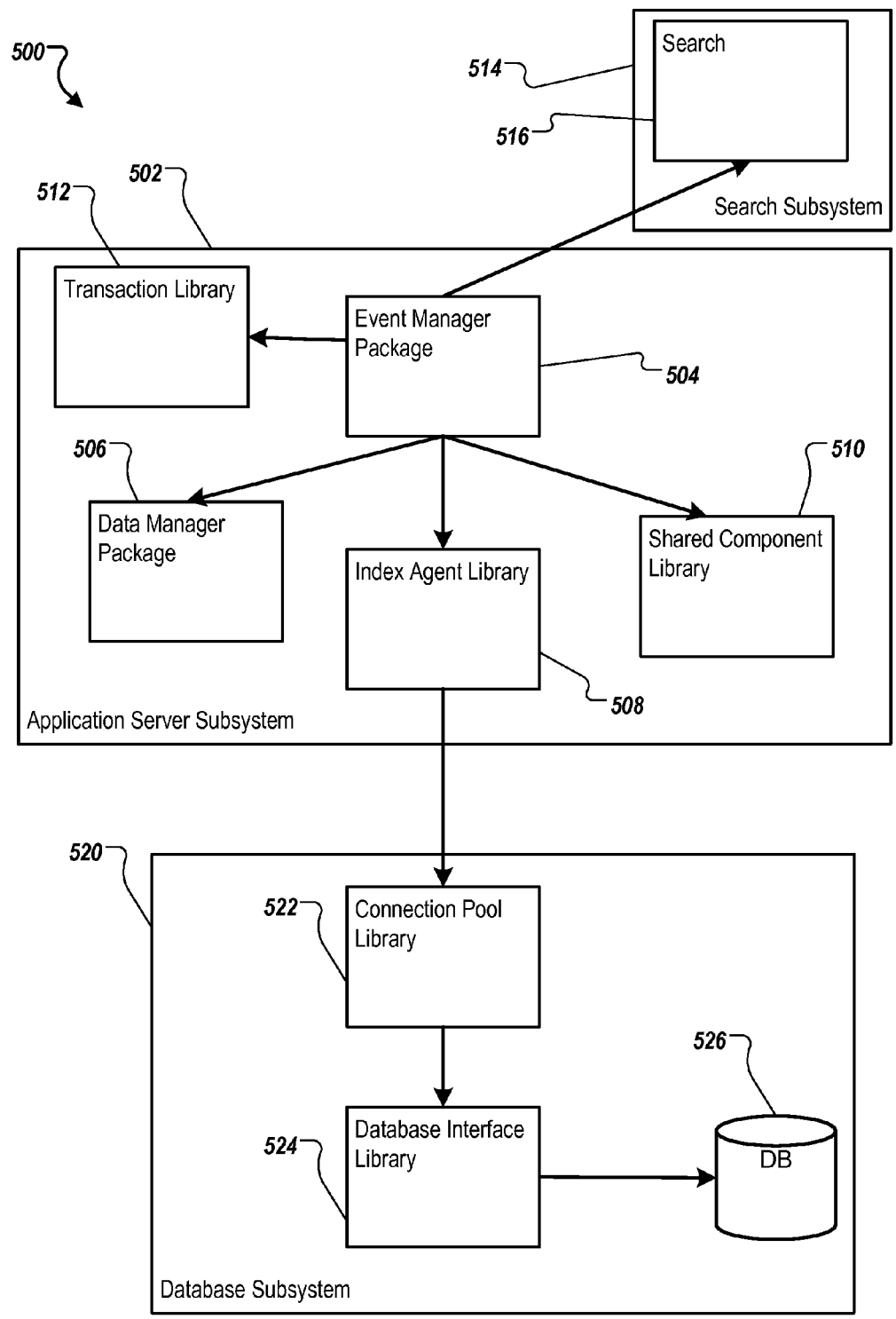
FIG. 5 is a deployment diagram of various subsystems of an exemplary document indexing system.

FIG. 5 is a deployment diagram of various subsystems of exemplary document indexing system 500. Document indexing system 500 can include a single server computer that hosts various software packages, or multiple server computers. The server computers can be organized in various clusters, each cluster including one or more computers. For example, the clusters can include application server subsystem 502, search subsystem 514, and database subsystem 520.

Packages deployed on application server subsystem 502 can include event manager package 504, data manager package 506, index agent library 508, shared component library 510, and transaction library 512. Shared component library 510 can include common components shared between document indexing system 500 and other systems. Transaction library 512 can include implementations of data access, transaction management, authentication, messaging, and other functions. Example components of transaction library 512 can include components of a Spring® Framework.

Packages deployed on search subsystem can include search package 516. Search package 516 can include commercially available search engines. Packages deployed on database subsystem 520 can include connection pool library 522, database interface library 524, and relational database 526. Example components of connection pool library 522 can include c3p0® library. Example components of database interface library 524 can include MySQL® Java Database Connectivity (JDBC) libraries.

Uploading a Document

FIG. 6A is a block diagram illustrating example components implementing functions of uploading unstructured data. The components can include upload servlet 602, data manager service 604, and upload manager utility 606. Upload servlet 602 can include a utility servlet for a client to upload unstructured data. Upload servlet 602 can include an API that processes request parsing for multiple requests.

Upload manager utility 606 can include a utility library that provides functions for identifying a type of the unstructured data (e.g., a file type) and generating a thumbnail of the unstructured data. Thumbnail generation will be described in further detail below. Data manager service 604 can include an application layer servlet for parsing multiple requests from various clients.

Figure 6B:
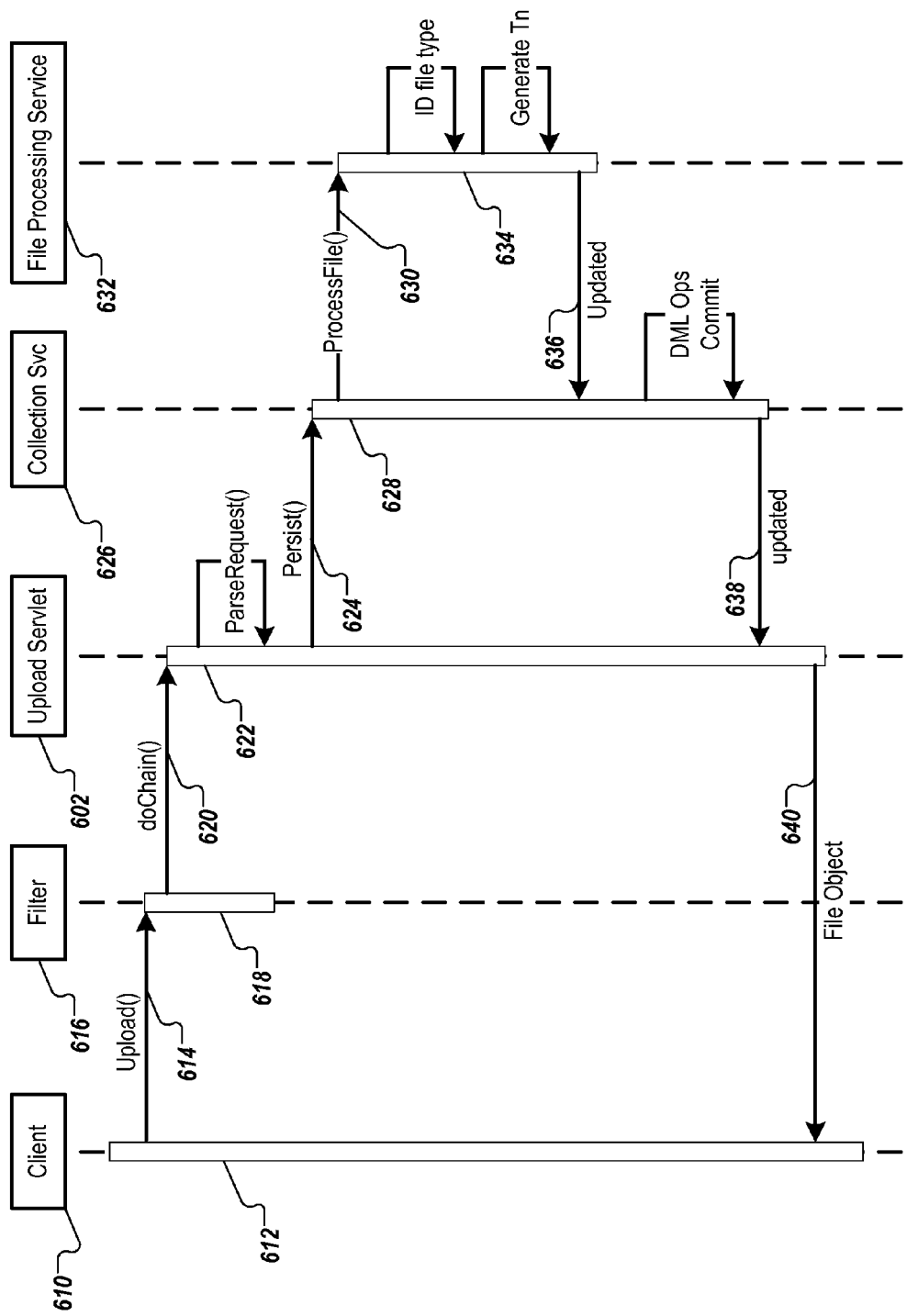
FIG. 6B is a sequence diagram illustrating interaction between a client component and a server component.

FIG. 6B is a sequence diagram illustrating interaction between a client component and a server component. Upon an upload request from a user, client 610 can invoke first process 612. First process 612, as well as other processes that will be described below, can include execution of a sequence of instructions of a function or a method or execution of a sequence of instruction of an application program. The processes can be independent processes managed by an operating system, or sections of one or more processes managed by an operating system. First process 612 can send upload message 614 to filter 616 indicating unstructured data (e.g., one or more documents) are being uploaded. Upload message 614, as well as other processes that will be described below, can include an instantiation of an object, or a function or method call. In response to upload message 614, filter 616 can invoke process 618 for authenticating the user. Process 618 can send the request, chained with other requests, to upload servlet 602 in message 620. Upon receiving message 620, upload servlet 602 can invoke process 622 for processing message 620.

Process 622 can parse the upload request from the user, and send persist message 624 to collection service 626. Persist message 624 can include a request to persist (e.g., store on as a file and/or in a database) the unstructured data to be uploaded. In response to persist message 624, collection service 626 can invoke process 628 for persisting the unstructured data. Process 628 can send process file message 630 to file processing service 632. In response, file processing service 632 can invoke process 634 for processing the unstructured data. Process 634 can identify type of the unstructured data, and generate a thumbnail of the unstructured data.

Upon completion of processing the unstructured data, process 634 can send an updated message 636 to process 628, indicating file processing has completed. Process 628 can perform database operations, for example, by executing DML commands on the database and commit any changes made by the commands to disk. Upon execution of the DML commands and the commit, process 628 can send message 638 back to process 622. In response to message 638, process 622 sends file object 640 to process 612.

Figure 6C:
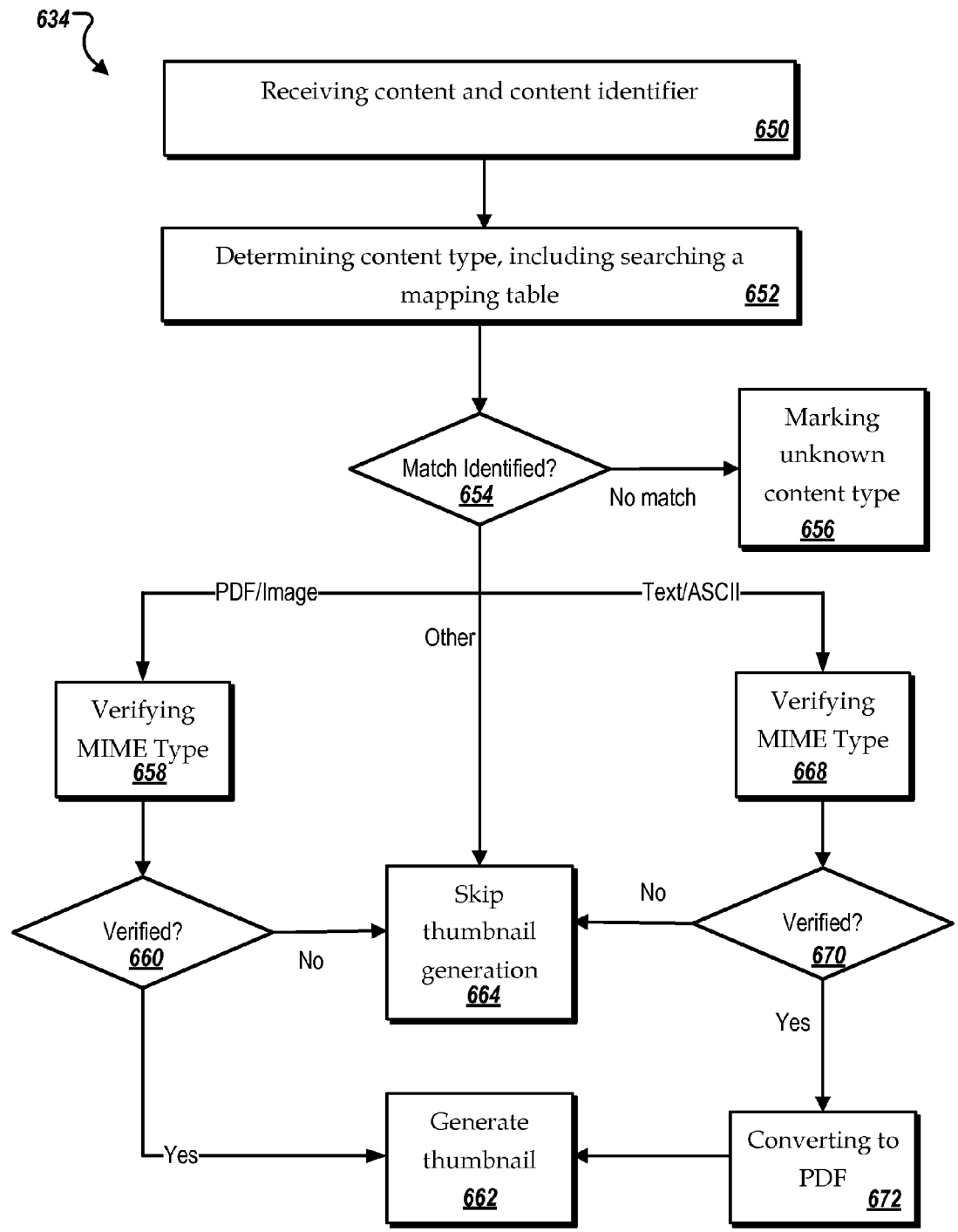
FIG. 6C is a flowchart of an exemplary process of processing unstructured data.

FIG. 6C is a flowchart of exemplary process 634 of processing unstructured data. Process 634 can be invoked by file processing service 632 and executed by a processor.

The processor can receive (650) content and content identifier. The content can include unstructured data uploaded in a data stream. The content identifier can include a file name. The processor can determine (652) a content type of the unstructured data. Determining the content type can include identifying an extension name from the file name (e.g., .pdf) and performing a search in a content type mapping table. The content type mapping table can specify, for example, that a ".pdf" extension name corresponds to a portable document format (PDF) type. In some implementations, the content type mapping table can have the following format: <file extension, file type, type description>. For unstructured data without extension or if the extension is not listed in the content type mapping table, the unstructured data can be marked as having a default type (e.g., <"unknown," "unknown," "unknown">. The type description can be localized.

In stage 654, the processor can determine what actions to perform based on the content type. If no match is found, the processor can mark (656) the content as unknown type. If a match is found, and the match indicates that the content is of PDF or image type, the processor can verify (658) a multipurpose Internet mail extension (MIME) type of the content. In stage 660, the processor can verify that the MIME type is consistent with the content type as determined in stage 652. If the MIME type is consistent with the content type as determined in stage 652, the processor can generate (662) a thumbnail image of the unstructured data. Generating the thumbnail image can be performed using various existing tools (e.g., ImageMagic® utilities). If the MIME type is inconsistent, the processor can skip (664) the thumbnail generation. The thumbnail image can be an image having a specified size (e.g., 200×200 pixels) and a specified format (e.g., a portable network graphics (PNG) format). Different content types can correspond to different thumbnail images. Table 3 lists file types and corresponding extensions and thumbnails images.

TABLE 3

| Content Types | | | |
|---|---|---|---|
| Type | Extensions | Thumbnail | Metadata |
| PDF | .pdf | PNG image of first page | Title, author, creator, producer, creation date, modification date, word count, etc. |
| TEXT | .txt, .html, .c, .h, .xml, .java | PNG image of first page | Title, copyright, version, word count |
| ZIP | .zip, .tar, .tar.gz, .z | Sample zip file icon | |
| MS Office | MS Office extensions | Various MS Office icons | Title, subject, creator, keywords, last modified, . . . |
| Image | .bmp, . . . | 200 × 200 thumbnail | Shutter speed, ISO, creator, . . . |
| Media | .mp3, .avi, . . . | Sample audio/video icon | Title, album, year, track, . . . |

If the content type is text or ASCII, the processor can verify (668) the MIME type of the content. In stage 670, the processor can verify that the MIME type is consistent with the content type as determined in stage 652. If the MIME type is consistent with the content type as determined in stage 652, the processor can convert (672) the unstructured data into PDF format and generate (662) the thumbnail from the converted PDF file.

Data Abstraction Layer

Figure 7:
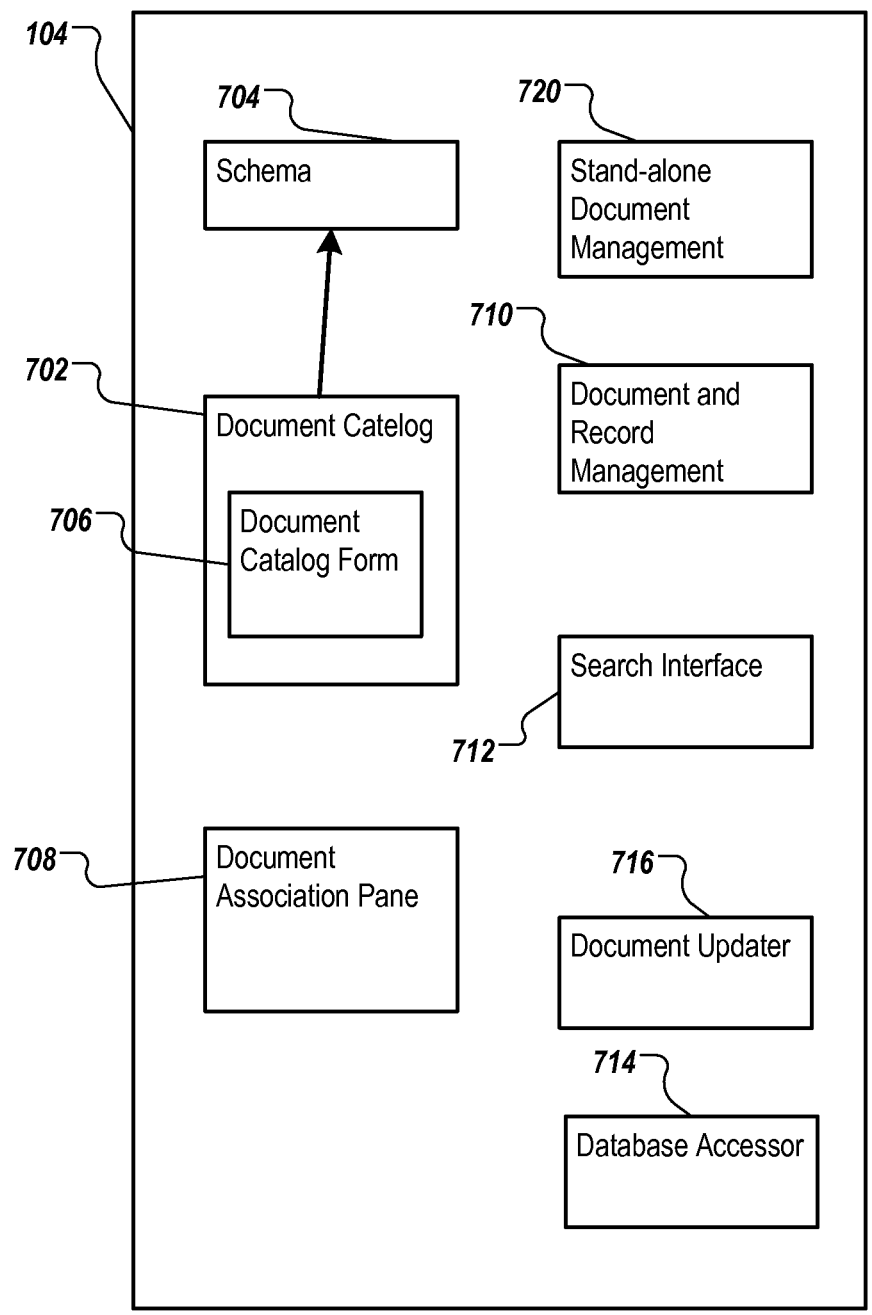
FIG. 7 is a block diagram illustrating an exemplary data abstraction layer of an integrated repository of structured and unstructured data.

FIG. 7 is a block diagram illustrating exemplary data abstraction layer 104 of the integrated repository of structured and unstructured data. Data abstraction layer 104 can include document catalog 702. Document catalog 702 can include a top-level, built-in catalog in data abstraction layer 104. Document catalog 702 can include a construct that has sufficient level of abstraction such that the construct can refer to structured data (e.g., a set of database records) and unstructured data (e.g., a series of documents)

Data abstraction layer 104 can automatically provide document catalog 702 to a user upon the user's signing up for an account. Document catalog 702 can be associated with schema 704. Schema 704 can define a set of fields that can track most common attributes of documents, for example, file name, file type, file size, creation date, modification date, and metadata including author, title, subject, and copyright information. Schema 704 can be extensible to allow the user to add a customized field to track additional information specific to the user's problem domain. For example, schema 704 can allow the user to add a field to track a status of a document or categorize documents by priority.

Document catalog 702 can provide various search functions on documents. An entry of a document can be inserted into document catalog 702 when the document is uploaded into the integrated repository. Data abstraction layer 104 can supervise generation of an index based on full text of the document being uploaded. The document can have any type. For example, the document can have a type (e.g., audio type, or executable type) such that the document is not suitable for display.

Document catalog 702 can include document catalog form 706 that is configured to provide for display a portion of the unstructured data (e.g., a portion of text). The portion of the content can include a first few paragraphs of text content when the unstructured data are being browsed or a matching portion of the unstructured data when the unstructured data are being searched.

Data abstraction layer 104 can include document association pane 708. Document association pane 708 can provide a way to allow a user to manage unstructured data in association with structured data without requiring the user to modify a schema. Document association pane 708 can associate one or more documents with a record in document catalog 702. Document association pane 708 can provide for display a list of documents currently associated with a record and allow management of the list.

Data abstraction layer 104 can include stand-alone document management module 720. Stand-alone document management module 720 can provide functions for sharing and storing documents among members of a work group. The functions can include functions for browsing a set of shared documents.

Data abstraction layer 104 can include document and record management module 710. Document and record management module 710 can provide functions for storing unstructured data in association with a data record when the unstructured data are uploaded, or storing unstructured data in association with a data record when the unstructured data are already associated with another data record. A same document can be associated with multiple data records. Document and record management module 710 can provide functions to view details of an uploaded document, when only some of the attributes of the document can be displayed. The details can be associated to a record.

Data abstraction layer 104 can include search interface 712. Search interface 712 can provide functions of basic search. The basic search can query both attributes of unstructured data and content of the unstructured data. For example, a basic search can include a search using search terms "meeting agenda." Search interface 712 can provide functions of advanced search. Advanced search can include criteria based search on unstructured data. For example, advanced search functions can allow a search of PDF documents created between Jan. 1, 2009 and Jan. 1, 2010 containing term "meeting agenda."

Data abstraction layer 104 can include document updater 716. Document updater 716 can receive a newer version of a document already associated with a data record, replace the older version, and configure the data record to be associated to the newer version of the document. Document updater 716 can update metadata extracted from the older version of the document using metadata extracted from the newer version of the document.

Data abstraction layer 104 can include database accessor 714. Database accessor 714 can provide functions of accessing a database record when a document associated with the data record is being browsed or provided as a search result.

Searching

Figure 8A:
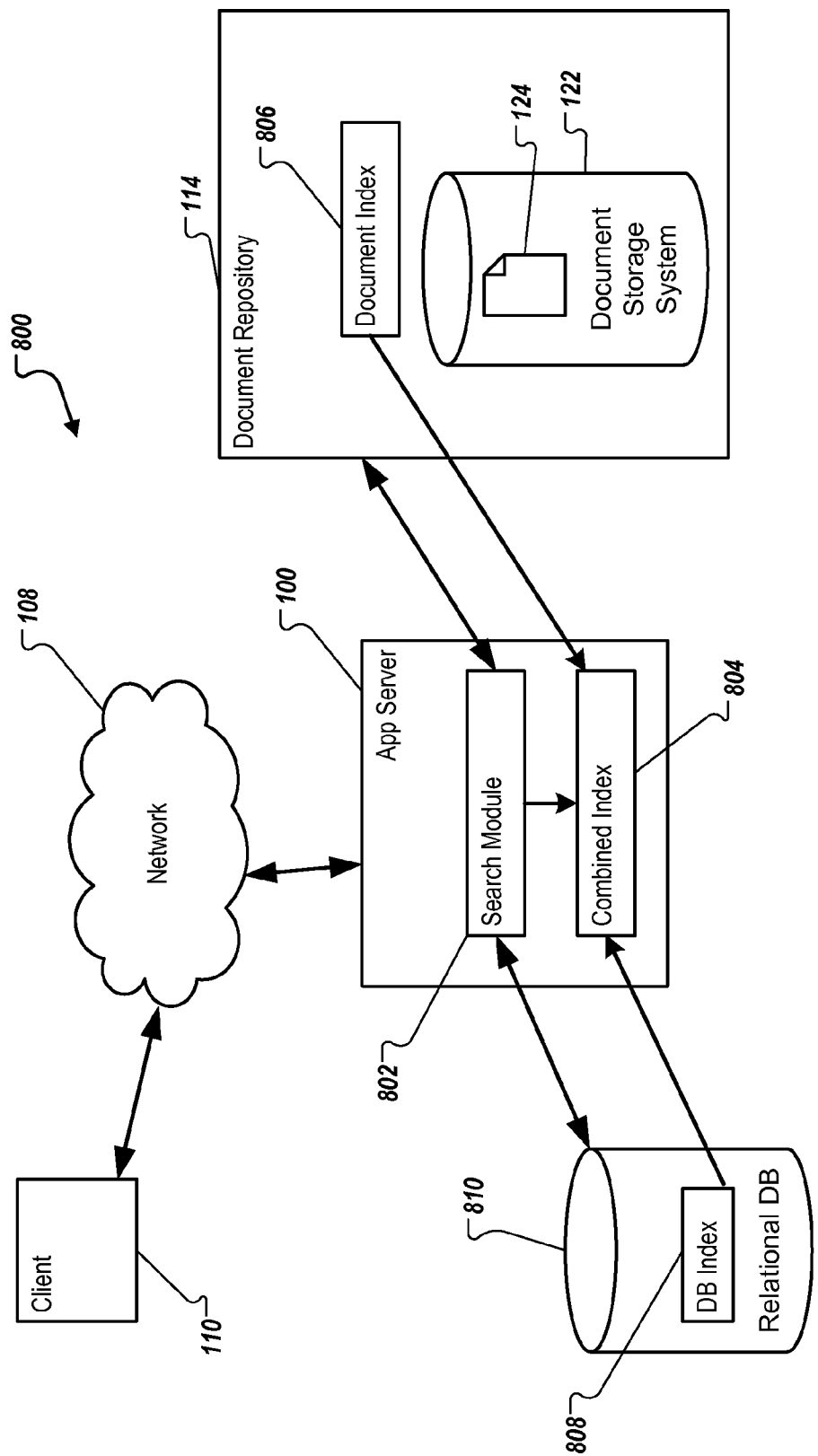
FIG. 8A is a block diagram illustrating an exemplary search architecture for an integrated repository of structured and unstructured data.

FIG. 8A is a block diagram illustrating exemplary search architecture 800 for integrated repository of structured and unstructured data. Referring to FIGS. 1 and 8A, application server 100 can receive a search request from client 110 through communications network 108. Application server 100 can perform search of both structured data and unstructured data. The structured data can be stored in a relational database. The unstructured data can be stored in document storage system 122 of document repository 114 as document 124.

Application server 100 can include search module 802 for searching both the structured data and the unstructured data. In some implementations, application server 100 can include combined index 804 that includes information on both the structured data and the unstructured data. The information on the structured data can include document index 806 and database index 808. Document index 806 can be a text based index created by an external process. Database index 808 can be a database index on the structured data. Combined index 804 can be stored in a directory structure illustrated in FIG. 8B below.

In some implementations, search module 802 can search document index 806 and database index 808 separately, and combine the search result. Database index 808 can be stored in relational database 810. Relational database 810 can include metadata database 142 or client data database 144 or both. Database index 808 can include an index on the structured data, including user data stored in client data database 144 and an index on metadata and a portion of content of the unstructured data stored in metadata database 142.

Figure 8B:
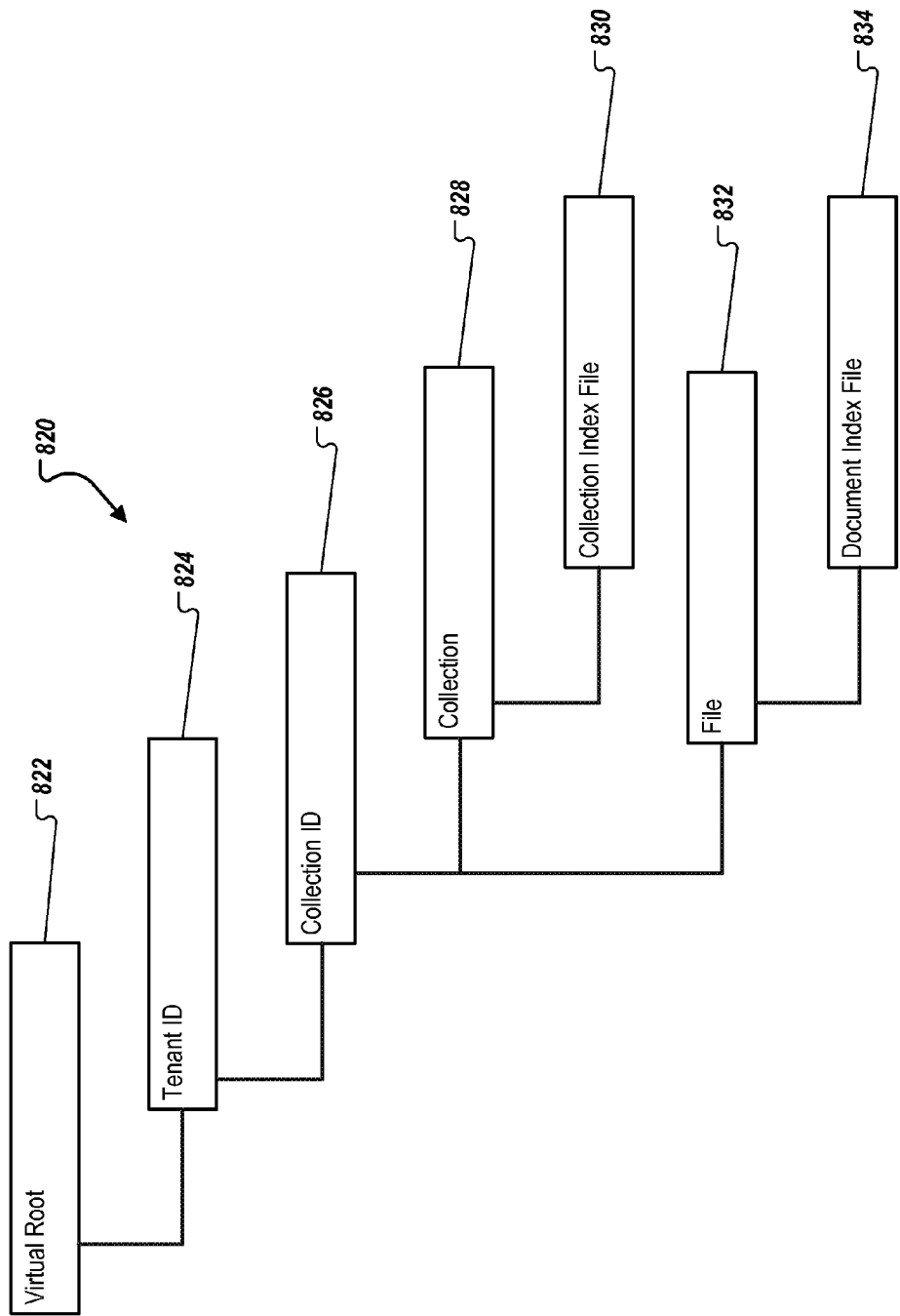
FIG. 8B illustrates an exemplary directory structure for storing indices.

FIG. 8B illustrates exemplary directory structure 820 for storing indices. A document index (e.g., document index 806) and a database index (e.g., database index 808) can have different structure. A combination of the document index and the database index can include storing the document index and the database index in association, grouped by collection in exemplary directory structure 820. Directory structure 820 can include virtual root 822. Virtual root 822 can include one or more first level subdirectories 824, each first level subdirectory 824 corresponding to a tenant and identified by a tenant identifier. Each first level subdirectory 824 can include one or more second level subdirectories 826, each second level subdirectory 826 corresponding to a collection and identified by a collection identifier. Each second level directory can include collection directory 828 and file directory 832. Collection directory 828 can store collection index file 830, which includes indices of structured data. File directory 832 can store document index file 834, which can include indices of unstructured data.

Figure 9:
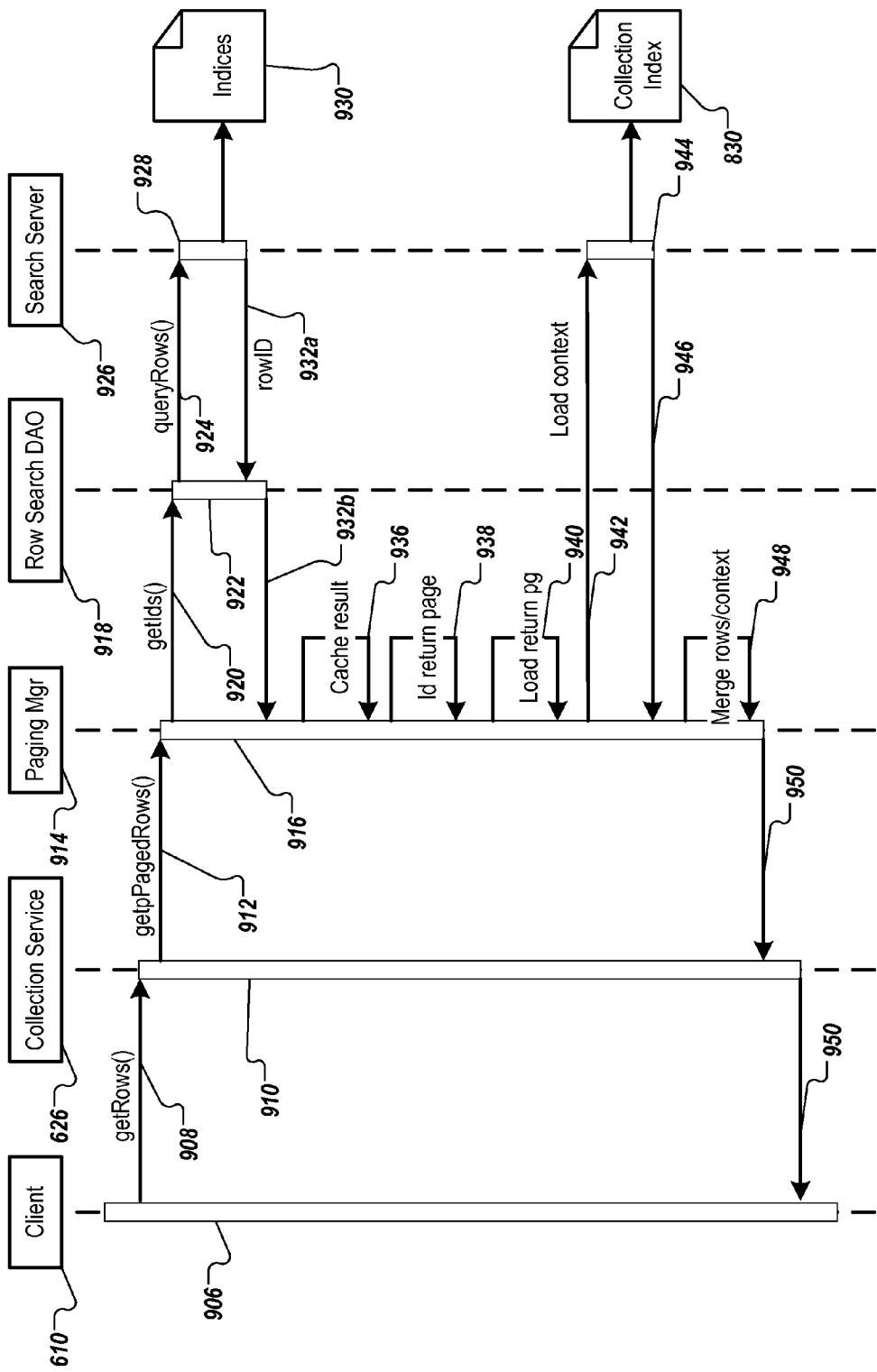
FIG. 9 is a sequence diagram illustrating interaction between a client component and a server component during search.

FIG. 9 is a sequence diagram illustrating interaction between a client component and a server component during search. Client 610 can invoke client side search process 906 to perform a search. Client side search process 906 can send search request message 908 to collection service 626. Search request message 908 can include a search query and context that includes a specification on a maximum number of rows to be returned. Upon receiving search request message 908, collection service 626 can invoke server side search process 910. Server side search process 910 can send get paged rows message 912 to paging manager 914.

Paging manager 914 can invoke paging process 916 for obtaining query results and processing the query results. To obtain the query results, paging process 916 can delegate the search request in search request message 908 to row search data access object (DAO) 918 using get IDs message 920. Row search DAO 918 can be a collection row search DAO for invoking various data access methods, including search methods. Upon receiving get IDs message 920, row search DAO 918 can invoke DAO search process 922. DAO search process 922 can send query rows message 924 to search server 926. Query rows message 924 can have a parameter that includes a query string of the search query. Search server 926 can be a local or a remote search server.

Upon receiving query rows message 924, search server 926 can invoke search service 928. Search service 928 can search indices 930. Indices 930 can include collection index 830, or document index 834, or both, as described in reference to FIG. 8B. The search on collection index 830 and document index 834 if performed simultaneously can be performed in parallel. Search service 928 can return row identifier (row ID) list 932a to DAO search process 922, which, in turn, can return the row ID list 932b to paging process 916. Row ID lists 932a and 932b each can be a list containing tuples of data in the following exemplary format: <row_id, (file_id, hit_position), (file_id, hit position)>. The hit_position can represent a first hit position in a file represented by the file_id. The hit position can be a position in the file where a term satisfies the search query.

Paging process 916 can chunk search results into pages according to the specified maximum number of rows to be returned. Paging process 916 can store (936) row ID list 932b to a cache. Paging process 916 can identify (938) a return page based on the context in search request message 908, which can specify which portion of the result can be displayed by client 610. Paging process 916 can load (940) page rows from database to be returned to server side search process 910 and generate a list of collection rows. Paging process 916 can determine that the result includes a hit on a file. Paging process 916 can send get context request 942 to search server 926.

Upon receiving get context request 942, search server 926 can invoke a second search service 944, which can retrieve search hit context from collection index 830. The second search service 944 can return search hit context 946 to paging process 916. Paging process 916 can merge (948) search hit context 946 into an s_result column of the collection rows. Merged collection rows 950 can be returned to server side search process 910 and to client side search process 906.

Exemplary User Interface

Figure 10A:
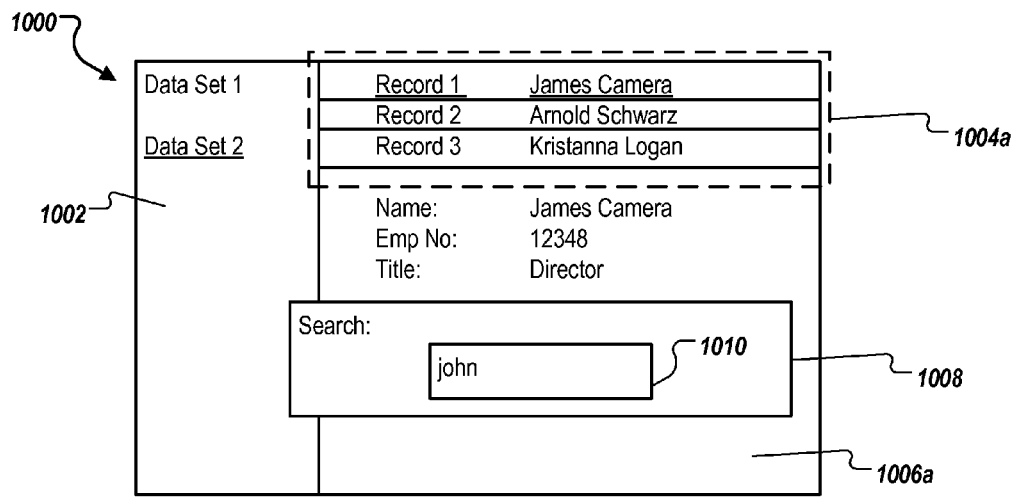
FIGS. 10A and 10B illustrate exemplary user interfaces for searching an integrated repository of structured and unstructured data and presenting a search result.
Figure 10B:
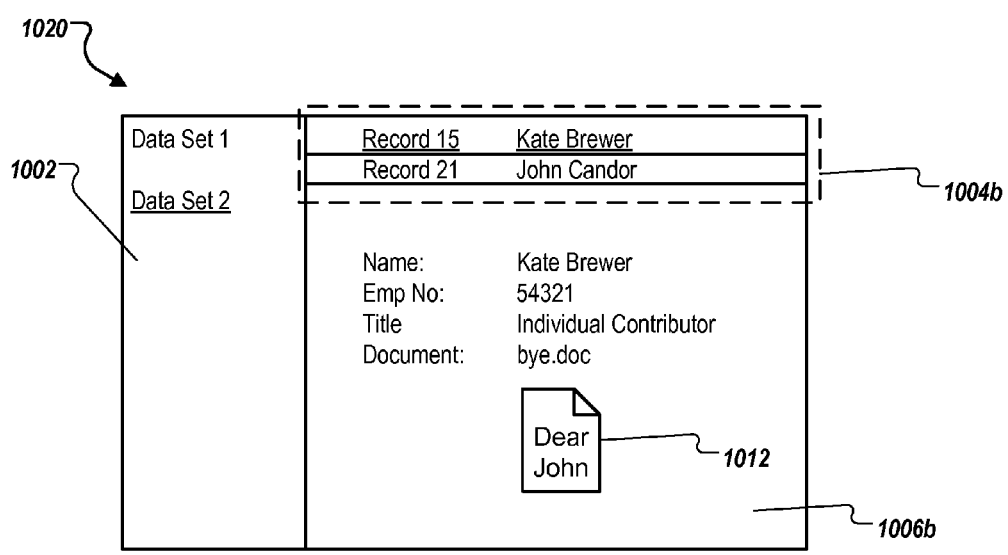

FIGS. 10A and 10B illustrate exemplary user interfaces for searching an integrated repository of structured and unstructured data and presenting a search result. FIG. 10A illustrates exemplary user interface 1000 that can include section 1002 that lists one or more data sets (e.g., "data set 1" and "data set 2"). Each data set can correspond to a database. Section 1002 can be configured to accept a user input selecting a dataset to access. A selected data set can be highlighted (e.g., by using underline).

User interface 1000 can include record list section 1004a that can display a list of records of the selected data set. The list of records can be selected based on one or more selection criteria (e.g., a selection criterion specified in a structured query language (SQL) query). Record list section 1004a can receive user input to select a particular data record. User interface 1000 can include main display pane 1006a that can display details of the selected data record.

User interface 1000 can include search pane 1008. Search pane 1008 can be displayed in response to a user input. Search pane 1008 can include search box 1010, which can accept a user input of a search term (e.g., "john"). In various implementations, search pane 1008 can include multiple input fields that can accept various search specifications (including search category, search time span, etc.).

FIG. 10B illustrates exemplary user interface 1020 that presents an exemplary search result. In response to a request to search on term "john" as specified in search box 1010 of FIG. 10A, search results can be presented. Record list section 1004b can display a list of records that are retrieved in response to the request. For example, record 21 can be retrieved because a data field (first name) contains name "John" that matches the search term. Record 15 can be retrieved even if there is no data field of record 15 that contains the term "john," because a document ("bye.doc") that is associated with record 15 contains the term "john" in phrase "Dear John." A thumbnail of the document can be displayed in main pane 1006b. In some implementations, main pane 1006b can display first page 1012 of the document (e.g., in regular size or reduced size) such that a portion of content of the document (e.g., the phrase "Dear John") can be displayed.

Exemplary Processes

FIGS. 11A-11D are flowcharts illustrating exemplary processes of implementing an integrated repository of structured and unstructured data. The processes can be executed by a system including a processor.

Figure 11A:
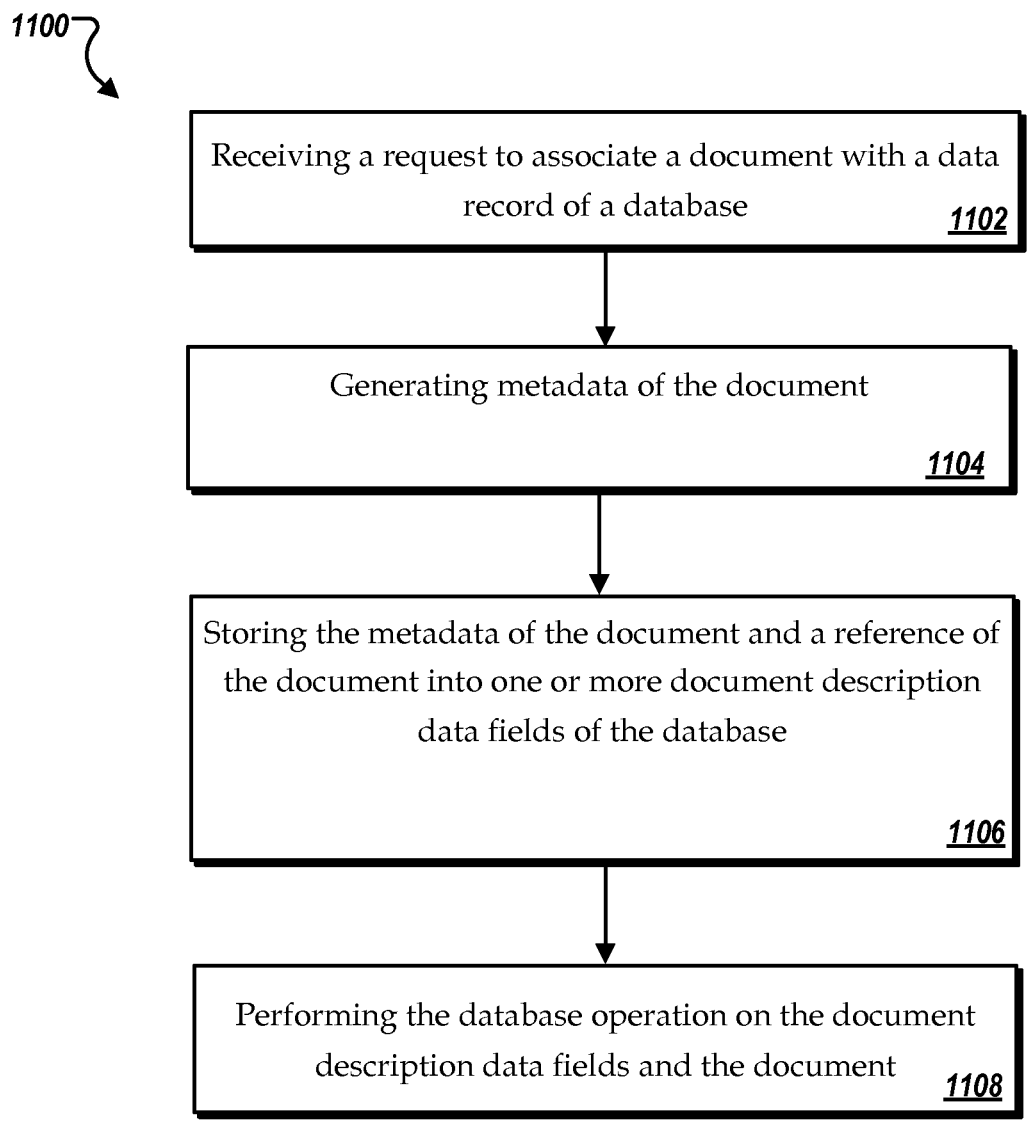
FIGS. 11A-11D are flowcharts illustrating exemplary processes of implementing an integrated repository of structured and unstructured data.

FIG. 11A is a flowchart illustrating exemplary process 1100 of integrating a document and a database using a document description. A system that includes one or more data processing devices can receive (1102) a request to associate a document with a data record of a database. The system can generate (1104) metadata of the document. The system can store (1106) the metadata of the document and a reference of the document into one or more document description data fields of the database. The reference can include a file name of the document. Upon receiving a request to perform a database operation on the data record, the system can perform (1108) the database operation on the document description data fields and the document. The database operation can include a search operation.

Figure 11B:
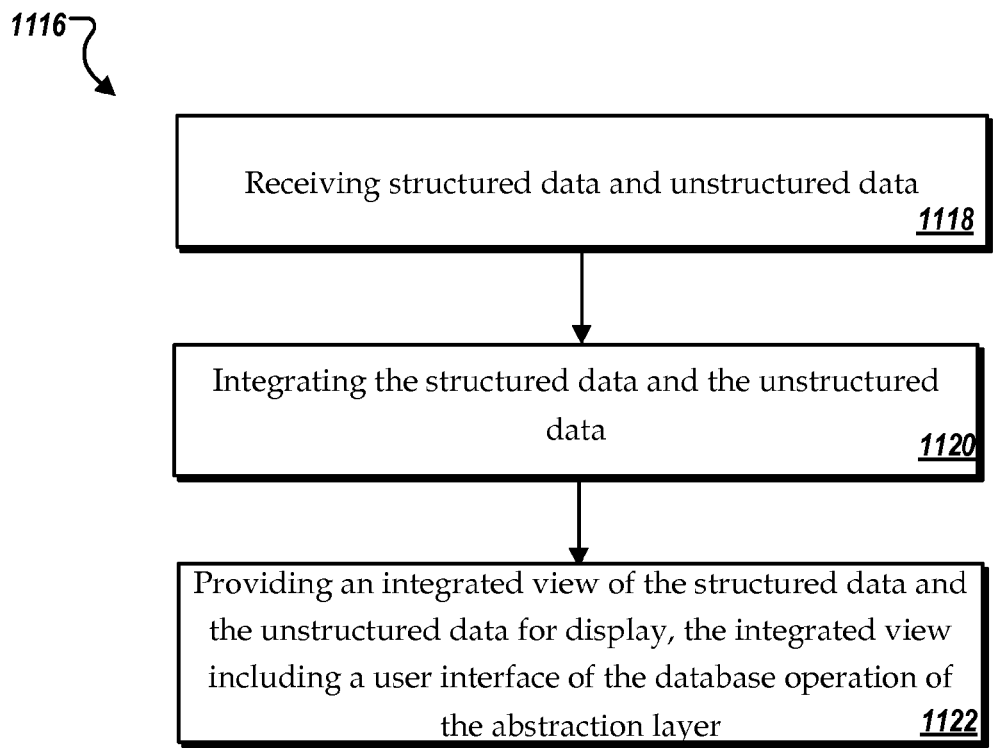

FIG. 11B is a flowchart illustrating exemplary process 1116 of integrating a document and a database using document description. A system can receive (1118) structured data and unstructured data. Receiving the structured data can include receiving a data record of a relational database. Receiving the unstructured data can include receiving a document to be inserted into a data field of the data record, the document having no internal structure or having an internal structure that is different from a structure of the database. The system can receive the document from a client device, and store the received document in a document repository.

The system can integrate (1120) the structured data and the unstructured data. Integrating the structured data and the unstructured data can include generating metadata from the unstructured data and, based on the generated metadata, configuring an abstraction layer to perform a database operation on both the structured data and the unstructured data. Generating the metadata from the unstructured data can include extracting the metadata from the document, and incorporating user created document attributes into the extracted metadata. The user created document attributes can include, for example, a note or a document description. Extracting the metadata can include determining a file type of the document.

Configuring the abstraction layer can include storing metadata of the document and a reference of the document into one or more document description data fields of the database. Storing the reference of the document can include storing, in one of the document description data fields, a location of the document in the document repository.

In some implementations of stage 1120, configuring the abstraction layer can include creating a document catalog defined using a predefined and configurable schema. The document catalog can be associated with a document catalog form that is configured to provide for display a portion of content of the document. In some implementations, performing the database operation can include providing access to other database data through the document. In some implementations, performing the database operation can include performing a database search.

The system can provide (1122) an integrated view of the structured data and the unstructured data for display. The integrated view can include a user interface for allowing the user to control the database operation of the abstraction layer. Providing the integrated view includes providing for display in the user interface the metadata of the document, at least a portion of content of the document, and other data in the database. The user interface can be a graphical user interface configured to display a thumbnail image of the portion of the content of the document.

In some implementations, process 1116 can further include receiving a request to replace the document using a new document. The system can update at least a portion of the metadata using metadata retrieved from the new document.

Figure 11C:
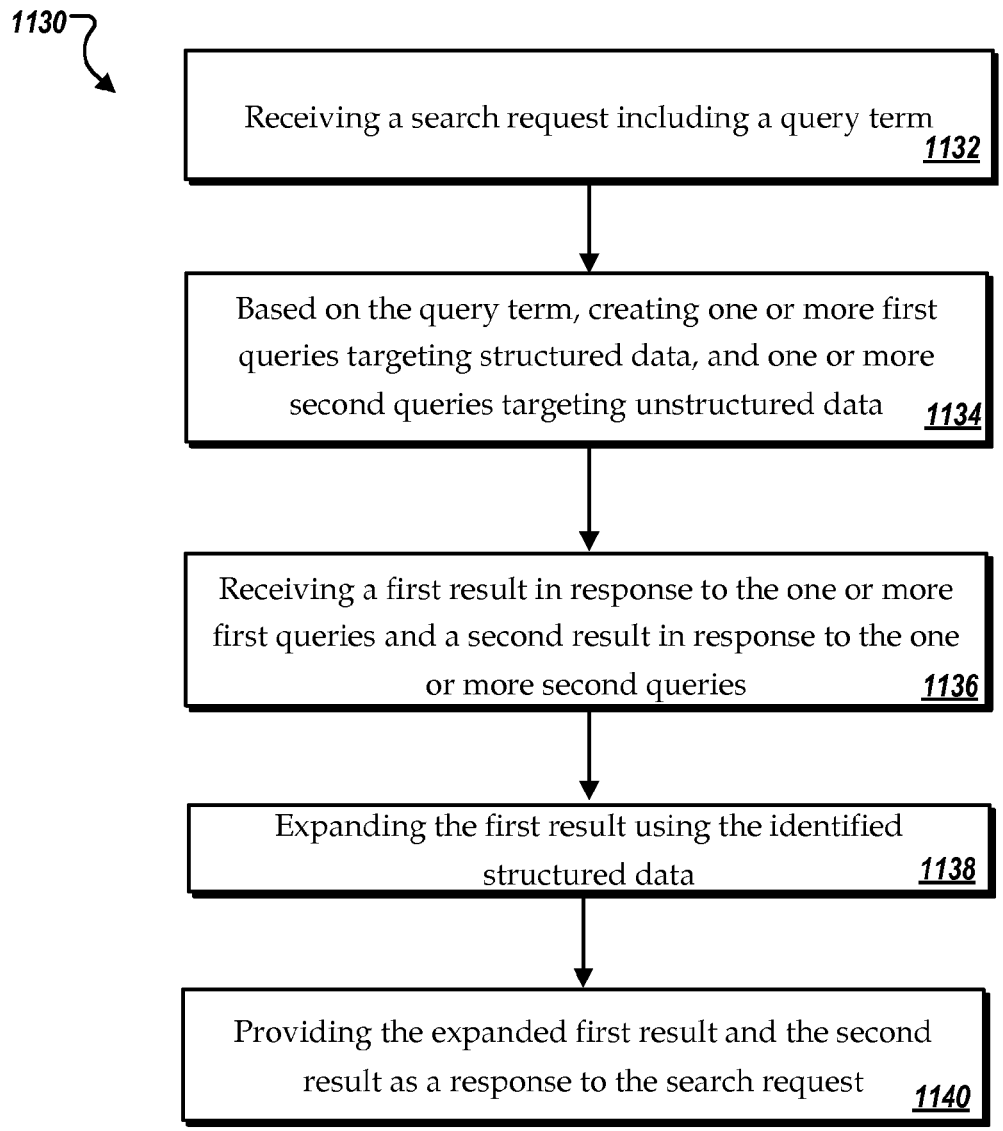

FIG. 11C is a flowchart of exemplary process 1130 of searching structured and unstructured data. A system can receive (1132) a search request including a query term. The search request can be received from a client device through a communication network. The query term can include a word or phrase to be searched (e.g., "john"), a date range, or a condition specified in a SQL statement (e.g., in a "WHERE" clause).

Based on the query term, the system can create (1134) one or more first queries targeting structured data, and one or more second queries targeting unstructured data. The structured data can include data in a relational database. The unstructured data can include one or more documents. Creating the one or more first queries can include creating a database query for searching the relational database using the query term. Creating the one or more second queries can include creating a text search query for searching the one or more documents and a metadata search query for searching metadata relating the one or more documents to the data in the relational database. The metadata can include, for example, data stored in the document table 302 and file table 304 as described in reference to FIG. 3. The metadata can include attributes of the one or more documents, the attributes include at least one of a document name, a document type, a document creation date, and an author.

The system can receive (1136) a first result in response to the one or more first queries and a second result in response to the one or more second queries. The first result can include rows of data from the relational database. The second result can include one or more documents, as well as rows of data that are related to the one or more documents. The second result can be associated with an identifier identifying structured data that are different from the first result. The identifier can include a row identifier identifying a row of data in the relational database, the row of data being related to the second result according to the metadata.

The system can expand (1138) the first result using the identified structured data. Expanding the first result can include creating a search hit context of the second result. The search hit context can identify a portion of unstructured data in the second result that matches the query term. Expanding the first result can include inserting the search hit context into the first result (e.g., in the s_result field as described above).

The system can provide (1140) the expanded first result and the second result as a response to the search request. Providing the expanded first result and the second result as a response to the search request can include providing the expanded first result and the second result for display in an integrated display environment. The integrated display environment can include a web page displayed in a web browser.

In some implementations, process 1130 can further include receiving an upload of the unstructured data. The system can store the unstructured data separate from a database storing the structured data, e.g., in a document repository. The system can extract metadata of the unstructured data and generate a graphical representation (e.g., a thumbnail image) of the unstructured data. The system can insert the metadata and a document reference that refers to the unstructured data into a table of the database. The document reference can include a file name and a path relative to a root directory of the document repository.

In some implementations, process 1130 can further include determining a row identifier in the structured data. The row identifier can identify a row of data in a table of a database storing the structured data. The row of data can include a reference to the unstructured data. The system can associate an index of the unstructured data with a database index using the row identifier.

Figure 11D:
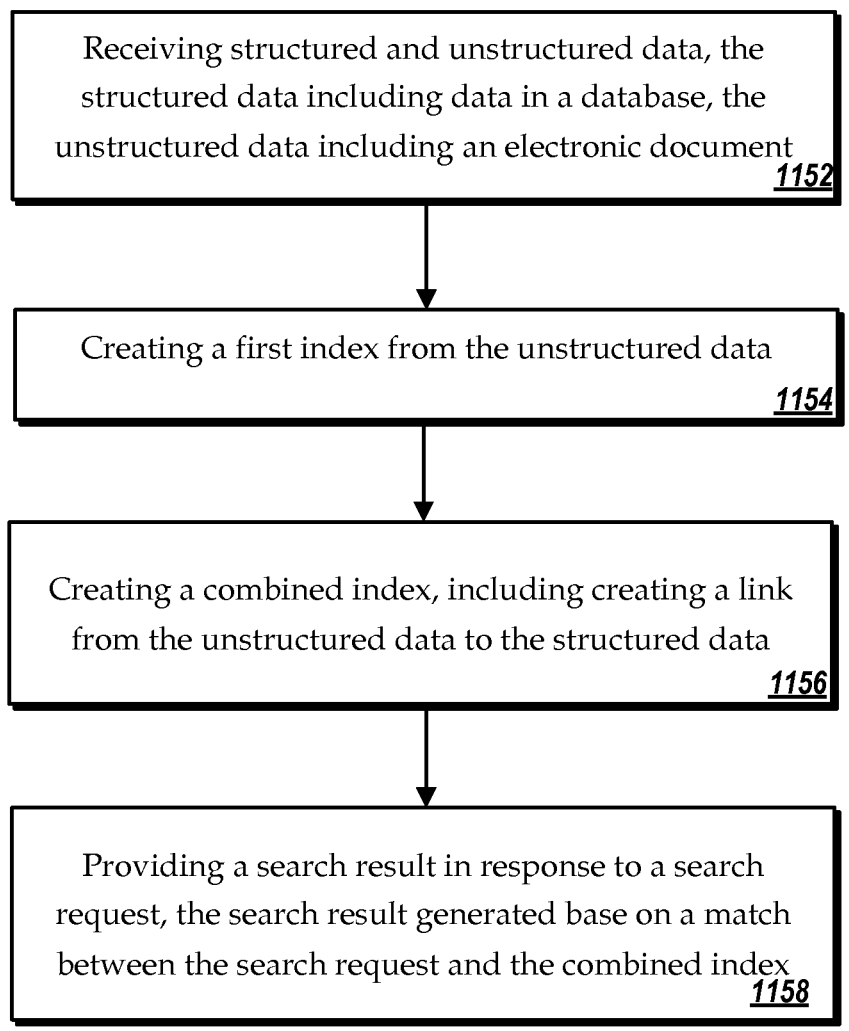

FIG. 11D is a flowchart of exemplary process 1150 of indexing structured and unstructured data. A system can receive (1152) structured and unstructured data. The structured data can include data in a database. The unstructured data can include an electronic document. Receiving the unstructured data can include receiving an input to insert the unstructured data into a table of the database. In response to the input, the system can store the unstructured data separate from the database, and present a user interface as if the unstructured data is part the database. The system can extract metadata of the unstructured data, and insert the metadata and a document reference that refers to the stored unstructured data into the table of the database.

The system can create (1154) a first index from the unstructured data. Creating the first index can include creating the first index based on content of the unstructured data.

The system can create (1156) a combined index using the first index, including creating a link from the unstructured data to the structured data. Creating the combined index can include determining a row identifier in the structured data. The row identifier can identify a row of data in a table of the database. The row of data can include the document reference. The system can associate the first index with the database index using the row identifier.

The system can provide (1158) a search result in response to a search request. The search result can be generated based on a match between the search request and the combined index. The search result can be paginated and displayed in an integrated display environment for displaying both database data and content of an electronic document.

Exemplary System Architecture

Figure 12:
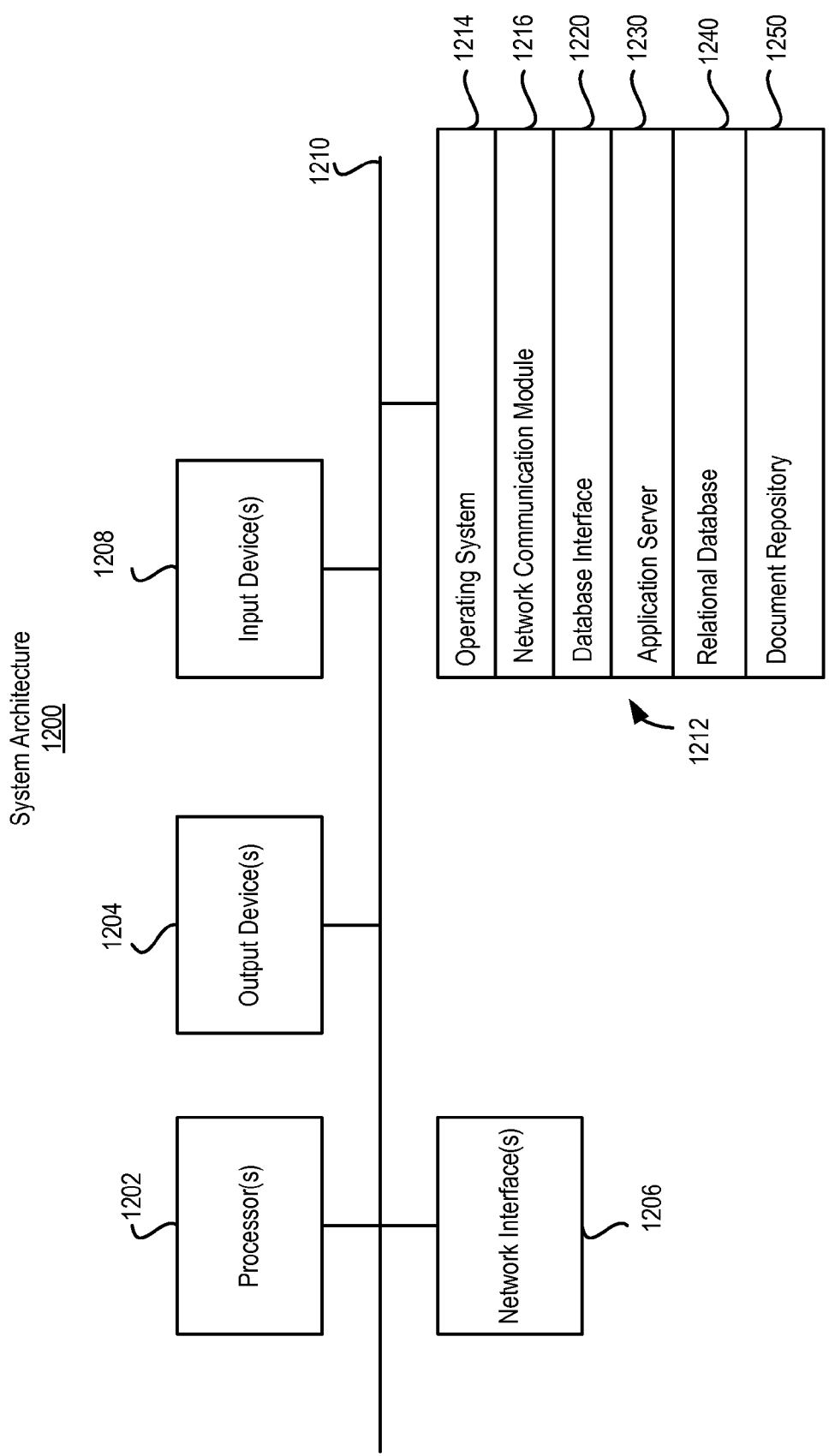
FIG. 12 is a block diagram of an exemplary system architecture for implementing the features and operations of FIGS. 1-11.

FIG. 12 is a block diagram of exemplary system architecture 1200 for implementing the features and operations described in reference to FIGS. 1-11. Other architectures are possible, including architectures with more or fewer components. In some implementations, architecture 1200 includes one or more processors 1202 (e.g., dual-core Intel® Xeon® Processors), one or more output devices 1204 (e.g., LCD), one or more network interfaces 1206, one or more input devices 1208 (e.g., mouse, keyboard, touch-sensitive display) and one or more computer-readable mediums 1212 (e.g., RAM, ROM, SDRAM, hard disk, optical disk, flash memory, etc.). These components can exchange communications and data over one or more communication channels 1210 (e.g., buses), which can utilize various hardware and software for facilitating the transfer of data and control signals between components.

The term "computer-readable medium" refers to any medium that participates in providing instructions to processor 1202 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1212 can further include operating system 1214 (e.g., Mac OS® server, Windows® NT server), network communication module 1216, database interface 1220, application server 1230, relational database 1240, and document repository 1250. Database interface 1220 can provide one or more user interfaces, interfaces between a server computer and a client computer, and interfaces between a relational database and other application program. Application server 1230 can be utilized provide various functions as described above. Relational database 1240 can include various tables (e.g., document tables and file tables) that link structured data to unstructured data. Document repository 1250 logic for storing unstructured data and indexing functions for creating index on the unstructured data.

Operating system 1214 can be multi-user, multiprocessing, multitasking, multithreading, real time, etc. Operating system 1214 performs basic tasks, including but not limited to: recognizing input from and providing output to devices 1204 and 1208; keeping track and managing files and directories on computer-readable mediums 1212 (e.g., memory or a storage device); controlling peripheral devices; and managing traffic on the one or more communication channels 1210. Network communications module 1216 includes various components for establishing and maintaining network connections (e.g., software for implementing communication protocols, such as TCP/IP, HTTP, etc.). Database interface 1220 can include interface to various databases including relational databases.

Architecture 1200 can be included in any device capable of hosting a database application program. Architecture 1200 can be implemented in a parallel processing or peer-to-peer infrastructure or on a single device with one or more processors. Software can include multiple software components or can be a single body of code.

The described features can be implemented advantageously in one or more computer program products that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), or plasma monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. For example, the terms "first row," "second row," "first event," and "second event" are used to refer to different rows or events. The occurrences of the events or the storage of the rows can be in any order. Accordingly, other implementations are within the scope of the following claims.

What is claimed is:
1. A method comprising:
receiving, by one or more computers and from a client, a search request, the search request comprising a search query;
performing a first search using the search query and one or more search indices stored on a server, the one or more search indices comprising a collection index generated from structured data and a document index generated from unstructured data;

receiving, as a result of the first search, a collection of record identifiers, each record identifier comprising a tuple of data including a file identifier identifying a document that is hit by the first search in the unstructured data and a row identifier identifying a record in the structured data, the record having a data field referencing the document;

performing a second search using the file identifier and the document index, including retrieving a search hit context from the document, the search hit context comprising one or more words in the document surrounding a term in the search query;

merging the record identified by the row identifier and the search hit context into a search result; and providing the search result to the client as a response to the search request.

2. The method of claim 1, wherein:
the search request comprises a search context specifying a number of rows to be returned; and
providing the search result to the client comprises determining a portion of the search result to be presented to the client based on the search context, and providing the determined portion of the search result to the client.

3. The method of claim 1, wherein the tuple of data comprises the row identifier, the document identifier, and a hit position representing a location, in the document, of a first appearance of a term satisfying the search query.

4. The method of claim 1, wherein merging the record identified by the row identifier and the search hit context comprises storing the search hit context into a reserved data field of the record.

5. The method of claim 1, wherein the document has an internal structure that is different from a structure defined in a database schema for the structured data.

6. The method of claim 1, comprising:
determining a content type of the document using a content type mapping table specifying a file extension name of the document and the content type corresponding to the file extension name;
generating a thumbnail image of the document based on the content type; and
providing the thumbnail image to the client in association with the search result.

7. A non-transitory storage medium storing computer instructions operable to cause one or more processors to perform operations comprising:
receiving, from a client, a search request, the search request comprising a search query;
performing a first search using the search query and one or more search indices stored on a server, the one or more search indices comprising a collection index generated from structured data and a document index generated from unstructured data;
receiving, as a result of the first search, a collection of record identifiers, each record identifier comprising a tuple of data including a file identifier identifying a document that is hit by the first search in the unstructured data and a row identifier identifying a record in the structured data, the record having a data field referencing the document;
performing a second search using the file identifier and the document index, including retrieving a search hit context from the document, the search hit context comprising one or more words in the document surrounding a term in the search query;
merging the record identified by the row identifier and the search hit context into a search result; and
providing the search result to the client as a response to the search request.

8. The non-transitory storage medium of claim 7, wherein:
the search request comprises a search context specifying a number of rows to be returned; and
providing the search result to the client comprises determining a portion of the search result to be presented to the client based on the search context, and providing the determined portion of the search result to the client.

9. The non-transitory storage medium of claim 7, wherein the tuple of data comprises the row identifier, the document identifier, and a hit position representing a location, in the document, of a first appearance of a term satisfying the search query.

10. The non-transitory storage medium of claim 7, wherein merging the record identified by the row identifier and the search hit context comprises storing the search hit context into a reserved data field of the record.

11. The non-transitory storage medium of claim 7, wherein the document has an internal structure that is different from a structure defined in a database schema for the structured data.

12. The non-transitory storage medium of claim 7, the operations comprising:
determining a content type of the document using a content type mapping table specifying a file extension name of the document and the content type corresponding to the file extension name;
generating a thumbnail image of the document based on the content type; and
providing the thumbnail image to the client in association with the search result.

13. A system, comprising:
one or more processors; and
a non-transitory storage medium storing computer instructions operable to cause the one or more processors to perform operations comprising:
receiving, from a client, a search request, the search request comprising a search query;
performing a first search using the search query and one or more search indices stored on a server, the one or more search indices comprising a collection index generated from structured data and a document index generated from unstructured data;
receiving, as a result of the first search, a collection of record identifiers, each record identifier comprising a tuple of data including a file identifier identifying a document that is hit by the first search in the unstructured data and a row identifier identifying a record in the structured data, the record having a data field referencing the document;
performing a second search using the file identifier and the document index, including retrieving a search hit context from the document, the search hit context comprising one or more words in the document surrounding a term in the search query;
merging the record identified by the row identifier and the search hit context into a search result; and
providing the search result to the client as a response to the search request.

14. The system of claim 13, wherein:
the search request comprises a search context specifying a number of rows to be returned; and
providing the search result to the client comprises determining a portion of the search result to be presented to the client based on the search context, and providing the determined portion of the search result to the client.

15. The system of claim 13, wherein the tuple of data comprises the row identifier, the document identifier, and a hit position representing a location, in the document, of a first appearance of a term satisfying the search query.

16. The system of claim 13, wherein merging the record identified by the row identifier and the search hit context comprises storing the search hit context into a reserved data field of the record.

17. The system of claim 13, wherein the document has an internal structure that is different from a structure defined in a database schema for the structured data.

18. The system of claim 13, the operations comprising:
   determining a content type of the document using a content type mapping table specifying a file extension name of the document and the content type corresponding to the file extension name;
   generating a thumbnail image of the document based on the content type; and
   providing the thumbnail image to the client in association with the search result.

\* \* \* \* \*